US007154590B2

(12) United States Patent
Williams et al.

(10) Patent No.: US 7,154,590 B2
(45) Date of Patent: Dec. 26, 2006

(54) DOPPLER TRACKING OPTICAL MONOPULSE

(75) Inventors: Brett A. Williams, Arlington, TX (US); Mark A. Turner, Arlington, TX (US); Brian C. Baker, Arlington, TX (US)

(73) Assignee: Lockheed Martin Corporation, Bethesda, MD (US)

(*) Notice: Subject to any disclaimer, the term of this patent is extended or adjusted under 35 U.S.C. 154(b) by 308 days.

(21) Appl. No.: 10/923,241

(22) Filed: Aug. 20, 2004

(65) Prior Publication Data

US 2006/0038977 A1 Feb. 23, 2006

(51) Int. Cl.
*G01C 3/08* (2006.01)
*G01P 3/36* (2006.01)
*G01S 13/72* (2006.01)

(52) U.S. Cl. ...................... 356/5.15; 356/5.15; 356/28; 356/141.1; 342/62

(58) Field of Classification Search ............... 356/4.08, 356/5.15, 27–28.5, 141.1; 342/54, 56, 62, 342/84, 98–99, 107, 113, 140; 244/3.1–3.3, 244/3.15–3.17, 3.19; 359/457
See application file for complete search history.

(56) References Cited

U.S. PATENT DOCUMENTS 4,717,916 A * 1/1988 Adams et al. .............. 342/107
4,818,071 A 4/1989 Dyott
5,245,347 A * 9/1993 Bonta et al. ................ 342/149
5,796,471 A 8/1998 Wilkerson et al.
5,847,816 A 12/1998 Zediker et al.
6,100,965 A 8/2000 Nerin
6,771,205 B1 * 8/2004 Barton et al. ................. 342/13
6,851,645 B1 * 2/2005 Williams et al. ........... 244/3.16
2004/0156035 A1 * 8/2004 Rogers ...................... 356/28.5

* cited by examiner

*Primary Examiner*—Thomas H. Tarcza
*Assistant Examiner*—Isam Alsomiri
(74) *Attorney, Agent, or Firm*—Williams, Morgan & Amerson, P.C.

(57) ABSTRACT

A method and apparatus for finding a relative direction to, a radial speed of, and a distance to a target is described. A laser source illuminates the target and the Doppler shifted return beam is incident upon a window system at an angle and is transmitted therethrough. The magnitude of the transmitted Doppler shifted beam decreases due to Fresnel transmittance. Opposing photomixers then detect this transmitted Doppler shifted beam, thereby creating a pair of detection signals that are mixed with a local oscillator signal. The mixing process creates Doppler frequency signals that are subsequently processed to determine the radial speed of the target. Due to the Doppler frequency component of the signals, objects in the same direction, but moving at different radial speeds, can be discriminated, as the relative direction processing occurs after the Doppler processing.

59 Claims, 17 Drawing Sheets

DOPPLER TRACKING OPTICAL MONOPULSE

FIELD OF THE INVENTION

The present invention relates to a method of and apparatus for detecting radiation. In particular, the present invention provides for determining the relative direction and speed of an object that reflects radiation, for example, for munition guidance purposes.

BACKGROUND OF THE INVENTION

Advances in technology have led to improvements in the precision of guided munitions. However, as guidance systems have become more sophisticated, the need for even greater precision is apparent. As military targets are frequently found in civilian surroundings, highly precise guidance systems are required to destroy these military targets while minimizing collateral damage to the civilian surroundings. One approach to increasing the precision of guided munitions is through using a laser designator to illuminate the desired target. A quadrant detector within the radome of the guided munition then guides the munition to maximize the reflected laser signal received from the illuminated target.

While such laser guided munitions have been in operation for quite some time, the radome/detector design limits the velocity of these guided munitions. In particular, many of the radome/detector designs include a hemispherical radome. The velocity of a guided munition having a hemispherical radome is limited due to the radome's aerodynamic drag. In an effort to reduce this aerodynamic drag, the use of more conic-shaped radomes has been attempted. However, this change in radome shape has created problems for the detector system used to guide the munition. Moreover, the simple quadrant detectors used in a hemispherical radome are incompatible with the optical transmission properties of a more conic-shaped radome.

Further, while laser guided munitions exist, the requirement of using a continuous laser for illuminating the target is undesirable. The use of a continuous laser creates a beacon for anti-aircraft batteries wishing to destroy the aircraft guiding the munition. For this reason, the use of a pulsed laser is desirable. This creates additional guidance problems as the guided munition receives far less reflected laser signal, resulting in the need for more accurate guidance feedback based upon this limited reflected laser signal. This requirement for accuracy in spite of limited reflected laser signal is even greater when the velocity of the guided munition increases.

An additional drawback of many laser guided munitions is the requirement for an external designator. This places the designator, for example the aircraft that released the guided munition, at risk. Given the fact that the designator must be within laser range of the target, such laser guided munitions cannot be operated in a "fire and forget" mode that minimizes risk.

A still further issue with laser guided munitions is tracking a moving target. A laser designator may lock onto a highly reflective object in the background rather than the desired moving target in the foreground. By not detecting whether an object is the desired moving target, the target itself may escape. This is especially true of certain countermeasures whose speed would not match that of a target, such as an aircraft.

Thus, a new approach for detecting an optical radiation signal that allows for greater guided munition velocities is needed that provides greater sensitivity for more accurate guidance of the munition. This new approach should be compatible with a conic-shaped radome. Further, the approach should discriminate targets from background based upon target speed by conducting angular processing after conducting Doppler processing. Lastly, the approach should be completely autonomous after the guided munition is released.

SUMMARY OF THE INVENTION

A first embodiment of the invention is an apparatus for determining the direction and speed of an object that reflects radiation relative to the apparatus. The apparatus comprises a laser source for emitting a laser beam and a beamsplitter for splitting this laser beam into two parts. The first part is a transmit beam that is subsequently directed toward the target, while the second part is a local oscillator beam. The transmit beam passes through a transmitting window system, while the portion of the transmit beam that is reflected by the target back to the apparatus, the Doppler shifted beam, passes through a receiving window system. The Doppler shifted beam has been Doppler shifted in frequency due to the radial speed of the target. The receiving window system, having Fresnel transmittance properties, defines an optical axis. The receiving window system is configured such that if the Doppler shifted beam is parallel to the optical axis, the Doppler shifted beam is incident upon a surface of the receiving window system at a boresight incidence angle. The boresight incidence angle is selected such that an instantaneous rate of change of the Fresnel transmittance as a function of angle of incidence at the boresight incidence angle is significantly different from zero. The Doppler shifted beam, having passed through the receiving window system, is combined with the local oscillator beam using four beam combiners. These combined Doppler shifted and local oscillator beams are incident upon four photomixers, which photomix the combined Doppler shifted and local oscillator beams. Each of the photomixers generates a respective photomixed signal. A portion of each photomixed signal is phase shifted by a corresponding phase shifting element, thereby generating corresponding shifted photomixed signals. Both the photomixed signals and the shifted photomixed signals are converted from analog signals to digital data using A/D converters. This digital data is then stored in a Doppler bin array. An angle processor subsequently determines the azimuth and elevation angles to the target relative to the window system optical axis using the digital data.

The second embodiment of the present invention, builds upon the first embodiment, but includes a second local oscillator and mixing stage to permit use with high radial speed targets. After the photomixing stage of the first embodiment, a portion of the photomixed signals is mixed with a second local oscillator signal. Another portion of the photomixed signals is mixed with a phase shifted portion of the second local oscillator signal. The outputs from each of these mixing processes is then converted into digital data and processed as with the first embodiment.

A third embodiment of the present invention uses an acousto-optic modulator to modulate the wavelength of the laser beam to account for the expected changes in wavelength due to Doppler shifts. Functionally, the acousto-optic modulator takes the place of the second local oscillator of the second embodiment.

BRIEF DESCRIPTION OF THE DRAWINGS

The present invention is described in reference to the following Detailed Description and the drawings in which.

DETAILED DESCRIPTION OF THE PREFERRED EMBODIMENTS

Determining both the relative direction and speed of a target can be a complicated task. One proposed method for determining the relative direction of target is disclosed in related U.S. patent application Ser. No. 10/729,066, a previous invention of the present inventors. A brief summary of this related art follows as it also describes the direction detection portion of the present invention.

Figure 1A:
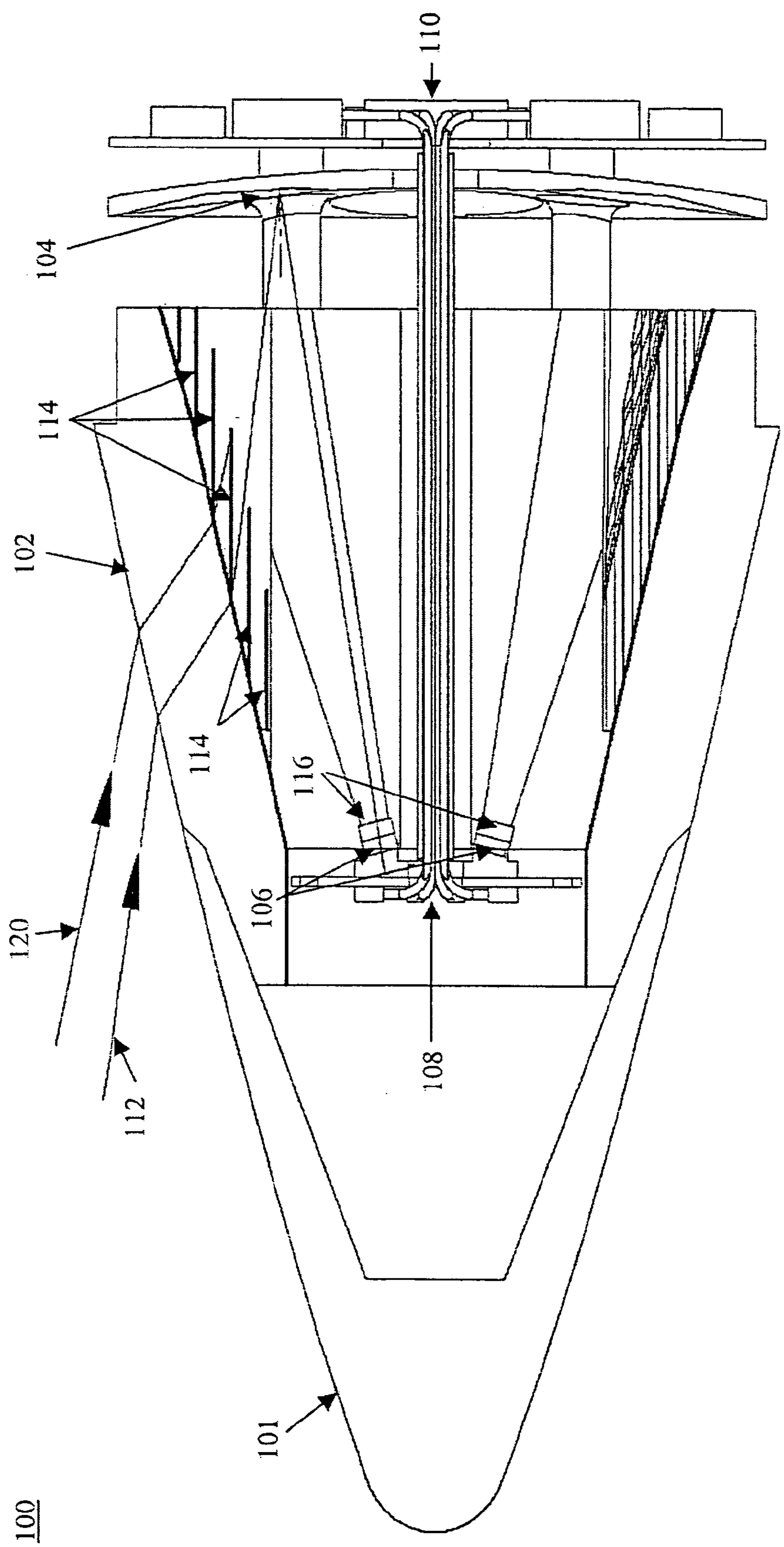
FIGS. 1A–1B are cross-sectional drawings of radomes incorporating a related art direction finding system.

FIG. 1A illustrates a related art direction finding system 100 for use in a guided munition. The direction finding system 100 includes a radome 101 with a receiving window system 102 that receives and transmits therethrough a radiation pulse 112, typically a laser pulse. The receiving window system 102 must be made of a material that transmits the radiation pulse 112, but can also withstand aerodynamic heating due to the velocity of the guided munition. Moreover, the receiving window system 102 must be able to withstand abrasion, such as that caused by dust or sand impacting the receiving window system 102 at a high velocity. Based upon these requirements, fused silica is the preferred material for the receiving window system 102 when considering the wavelengths used by most laser pulse designators. Other possible receiving window system materials may include ZnSe, $Al_2O_3$, and Ge. While the receiving window system 102 shown in FIG. 1A is essentially a collar going around the entire radome 101, this need not be the case. Depending upon a number of factors, including shape of the radome 101, strength of the receiving window system materials, manufacturability, and cost, it may be preferable to include a separate window for each radiation detector 106 in the direction finding system 100. In addition, while FIG. 1A illustrates a receiving window system 102 having a constant thickness, FIG. 3B illustrates the case where the receiving window system thickness varies linearly.

Upon transmission through the receiving window system 102, a reflector 104 reflects the radiation pulse 112 onto the radiation detector 106. The reflector 104 preferably has a curved surface, thereby focusing the radiation pulse 112 onto the radiation detector 106. Alternatives to a curved reflector 104 are reflective holograms and reflecting binary optics. The radiation detector 106, generates a detection signal when it absorbs the radiation pulse 112. The radiation detector 106 should be mechanically robust to withstand vibrations and stresses encountered during launch and flight of a guided munition. In addition, the radiation detector 106 must absorb the radiation pulse 112, thus selection of the radiation detector 106 depends upon the wavelength of the radiation pulse 112. Furthermore, the radiation detector 106 must respond to the frequently very short duration of the radiation pulse 112. Photodetectors, especially photodiodes, comprised of semiconductor material typically meet these requirements and thus are the preferred radiation detectors 106. A wiring harness 108 transmits the resulting detection signals, one detection signal for each radiation detector 106, to a processor 110. While some signal processing, such as noise reduction, may be done for each individual detection signal, the detection signals are summed and differenced to determine the relative direction from which the radiation pulse 112 came.

Figure 1B:
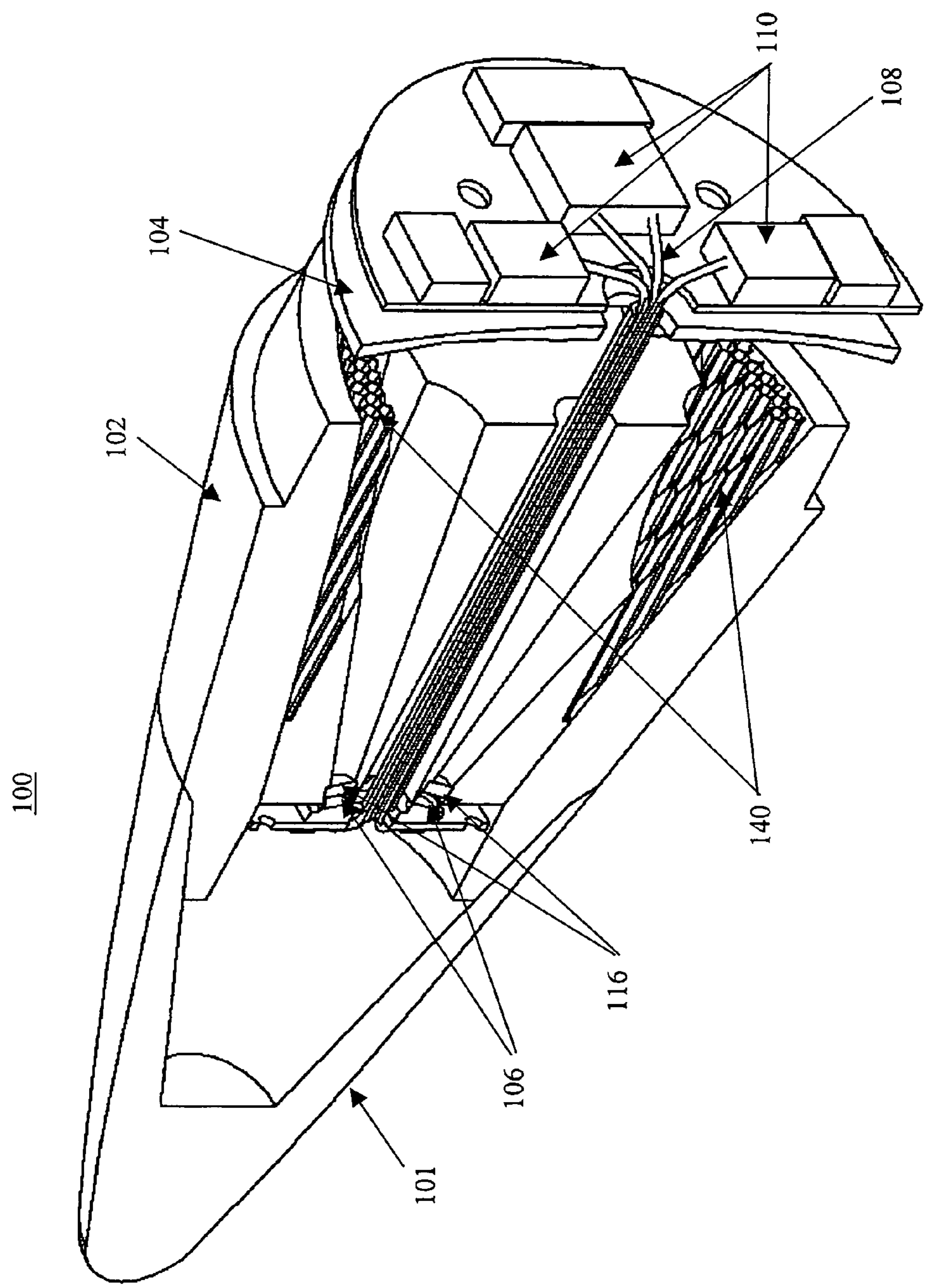

Several additional, optional elements may serve to further reduce the noise of the related art direction finding system 100. The first additional elements are light baffles 114. The light baffles 114 form a series of coaxial hollow cylinders that only transmit radiation pulses 112 incident at certain angles. As an example, radiation pulse 120 is incident at an angle greater than radiation pulse 112. As a radiation pulse intended to guide the munition should be found within a given solid angle of the guided munition, a radiation pulse outside of this given solid angle should be ignored. Such stray radiation pulses 120 could be from a second target illuminated by a different laser designator. Alternatively, the radiation pulse 120 could be a countermeasure. In either of these cases, the guidance system should ignore these stray radiation pulses 120. By employing light baffles 114, the stray radiation pulses 120 are blocked and absorbed by the light baffles 114 prior to being absorbed by the radiation detectors 106. As shown in FIG. 1B, light tubes 140 are an alternative to the light baffles 114. A light tube, much like a soda straw, would only transmit a radiation pulse that is nearly parallel to the axis of the light tube. Radiation pulses that are not nearly parallel to the axis of the light tube would be blocked and absorbed, much as with the light baffles. A further method to block countermeasures is to encode the radiation pulse 112, e.g., with a code that would change each day, such that any detected radiation pulse 112 that does not include the correct code would be ignored. This method would also allow several direction finding systems 100 to operate in the same area concurrently without conflicting with each other as each could have its own unique code.

Another method of reducing the noise of the guidance system is to use a radiation filter 116 as shown in FIG. 1A. The radiation filter 116, placed in front of the radiation detector 106, blocks a portion of the radiation incident thereon. The radiation filter 116 is preferably a bandpass filter. The method of constructing such a bandpass filter is well know in the art and thus a discussion of the design and construction of a bandpass filter is omitted here. The bandpass filter would transmit radiation within a given wavelength range, while blocking substantially all other radiation.

By designing the bandpass filter to transmit radiation of the same wavelength used in the radiation pulse 112, the radiation filter 116 would block radiation pulses of different wavelengths, perhaps resulting from countermeasures and/or background radiation. When a laser creates the radiation pulse 112, use of a very narrow bandpass filter is possible as the wavelength band of the laser pulse is very narrow.

Figure 2A:
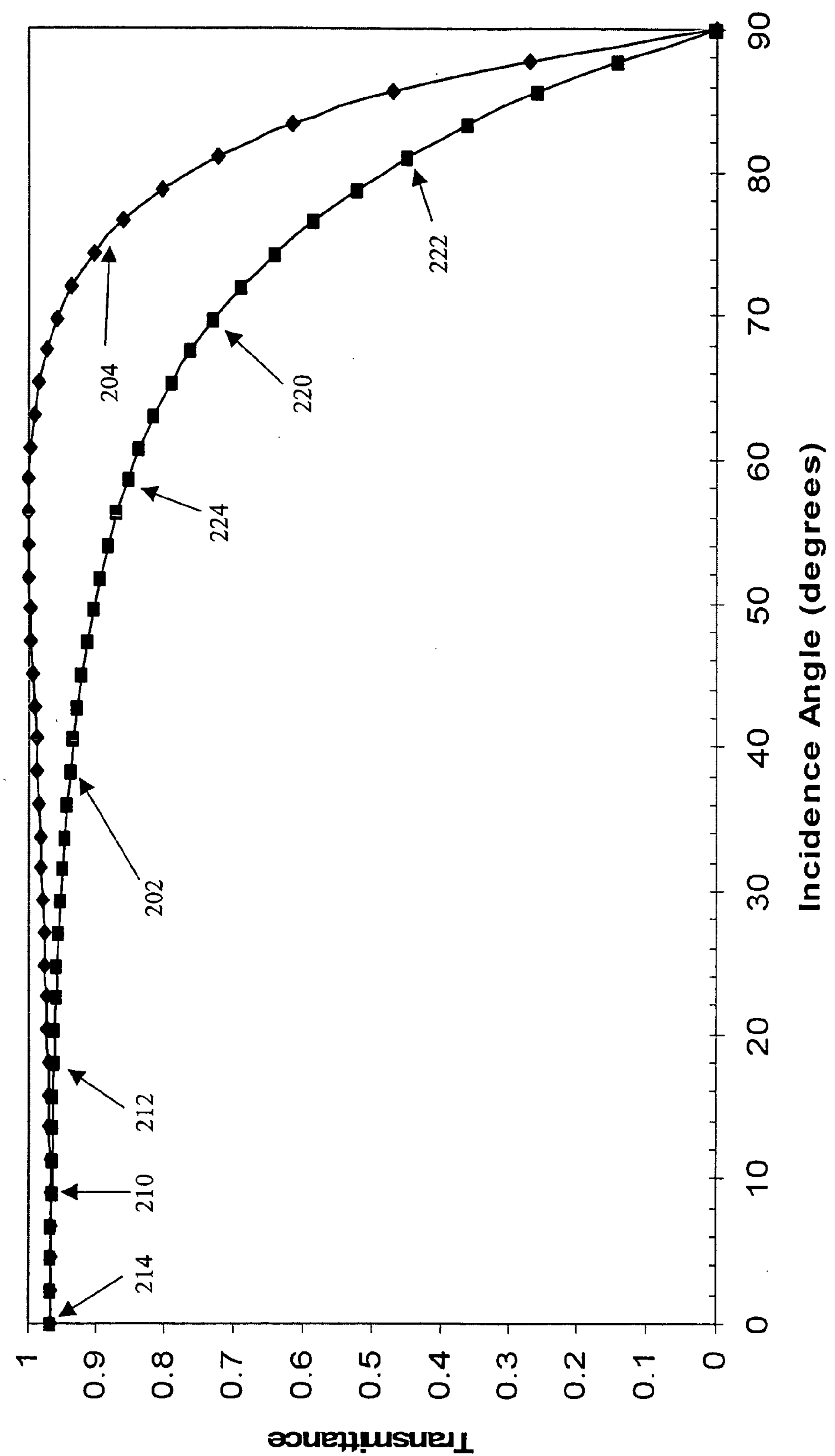
FIGS. 2A–2B are plots showing the Fresnel transmittance of radiation through an air/fused silica interface of the direction finding portion of the present invention.

To permit high velocities for the guided munition, a steeply raked radome is desirable. The use of a steeply raked radome provides significant advantages to both the related art and present inventions. As seen in FIG. 2A, the transmittance of radiation, as a percentage, through an air/fused silica interface is a strong function of both incidence angle and polarization based upon Fresnel's equations:

$$t_S=2n_i\cos(\theta_i)/[n_i\cos(\theta_i)+n_t\cos(\theta_t)],\text{ and} \qquad \text{Eq. 1}$$

$$t_P=2n_i\cos(\theta_i)/[n_i\cos(\theta_t)+n_t\cos(\theta_i)]. \qquad \text{Eq. 2}$$

In Fresnel's equations, Eq. 1 and Eq. 2, $t_S$ corresponds to the transmittance for S-polarized (perpendicular) radiation and $t_p$ corresponds to the transmittance for P-polarized (parallel) radiation. $\theta_i$ and $\theta_t$ correspond to the angles of incidence and transmission, respectively. Lastly, $n_i$ and $n_t$ correspond to the indices of refraction for the incident and transmitted materials, respectively. This dependence of the transmittance upon the angle of incidence shall be defined as Fresnel transmittance. Curve 202 shows the Fresnel transmittance $t_S$ for radiation incident upon the air/fused silica interface, while curve 204 shows the Fresnel transmittance $t_P$. At low angles, such as point 210 at 10 degrees, corresponding to a blunt or hemispherical radome, Fresnel transmittance is not a strong function of angle at all. More specifically, for an incident angle of 10 degrees, radiation received within an angle of plus 10 degrees (point 212) to minus 10 degrees (point 214) shows virtually no difference in Fresnel transmittance, regardless of polarization. In other words, the instantaneous rate of change of the Fresnel transmittance as a function of angle of incidence at 10 degrees is approximately zero. In contrast, an incident angle of 70 degrees (point 220), corresponding to a relatively sleek radome, shows significant differences in Fresnel transmittance for angles plus or minus 10 degrees. In other words, the instantaneous rate of change of the Fresnel transmittance as a function of angle of incidence at 70 degrees is significantly different from zero, i.e., the Fresnel transmittance is rapidly changing as a function of angle of incidence. For an incident angle of 70 degrees, radiation received within an angle of plus 10 degrees (point 222, 45% transmittance) to minus 10 degrees (point 224, 85% transmittance) shows a difference in Fresnel transmittance of 40% for S-polarized radiation. Thus, a sleek radome system benefiting from the Fresnel transmittance has a greater angular sensitivity than a blunt or hemispherical radome system. For guidance control, especially of a high velocity munition, the guidance system requires high angular sensitivity. Because the Fresnel transmittance is a strong function of incidence angle, yielding greater angular sensitivity, application of this varying transmittance for guidance purposes is useful. To benefit from the Fresnel transmittance, the incidence angle should be selected such that the Fresnel transmittance of the radiation varies significantly over the desired field of view, i.e., the slope of the Fresnel transmittance is significantly different from zero. The above example employed a field of view of plus or minus 10 degrees and a fused silica-based window system 102. Under these conditions, a minimum angle of incidence of at least approximately 60 degrees is preferred, with at least approximately 70 degrees being more preferred. The maximum incidence angle is approximately 80 degrees when a plus or minus 10 degree field of view is required. Note that these minimum and maximum incidence angles are a function of the window system material and the field of view. Referring again to FIG. 2, narrower fields of view will require greater minimum angles to ensure that the Fresnel transmittance varies significantly over the desired field of view. Based upon Fresnel's equations, Eq. 1 and Eq. 2, different indices of refraction will change the shape of the Fresnel transmittance curve, and thus the minimum angle of incidence. For example, $Al_2O_3$ has a greater index of refraction than fused silica, and therefore would require a smaller minimum angle of incidence. One of skill in the art will appreciate that these and other system parameters, including detector sensitivity, will determine how great the instantaneous rate of change of the Fresnel transmittance as a function of angle of incidence would need to be to achieve a required angle sensitivity.

Figure 2B:
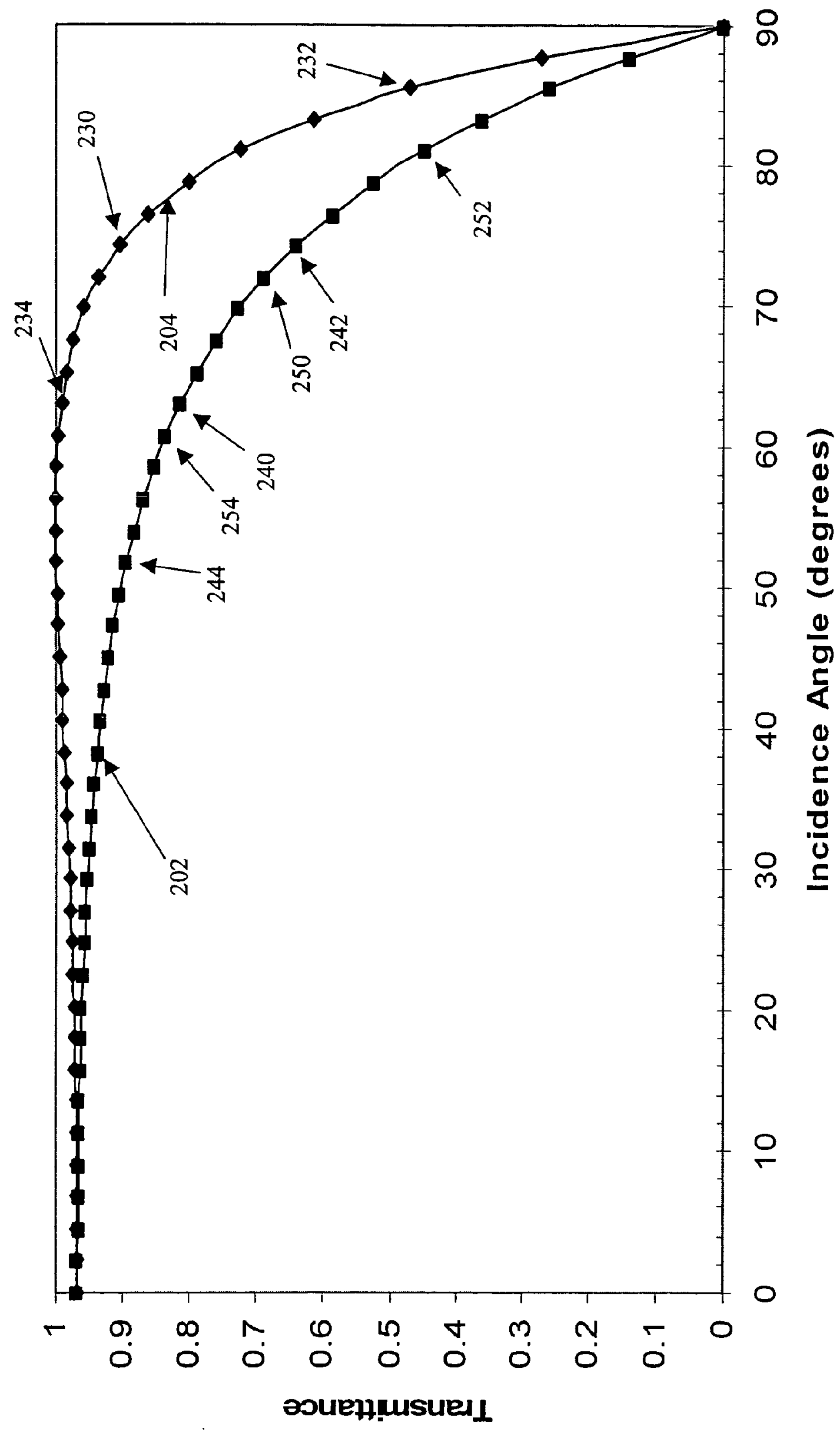

Specifying a middle field of view transmittance is an alternative method for defining a direction finding system design and is illustrated in FIG. 2B. For example, for a middle field of view Fresnel transmittance of 90% for P-polarized radiation (point 230), a plus or minus 10 degree field of view provides a change in Fresnel transmittance of approximately 50% (points 232 and 234). A middle field of view Fresnel transmittance of 80% for S-polarized radiation (point 240) provides a change in Fresnel transmittance of approximately 25% (points 242 and 244) over the plus or minus 10 degree field of view. A middle field of view Fresnel transmittance of 70% would be preferable for the S-polarized radiation (point 250) as the plus or minus 10 degree field of view change in Fresnel transmittance increases to 40% (points 252 and 254).

Figure 3A:
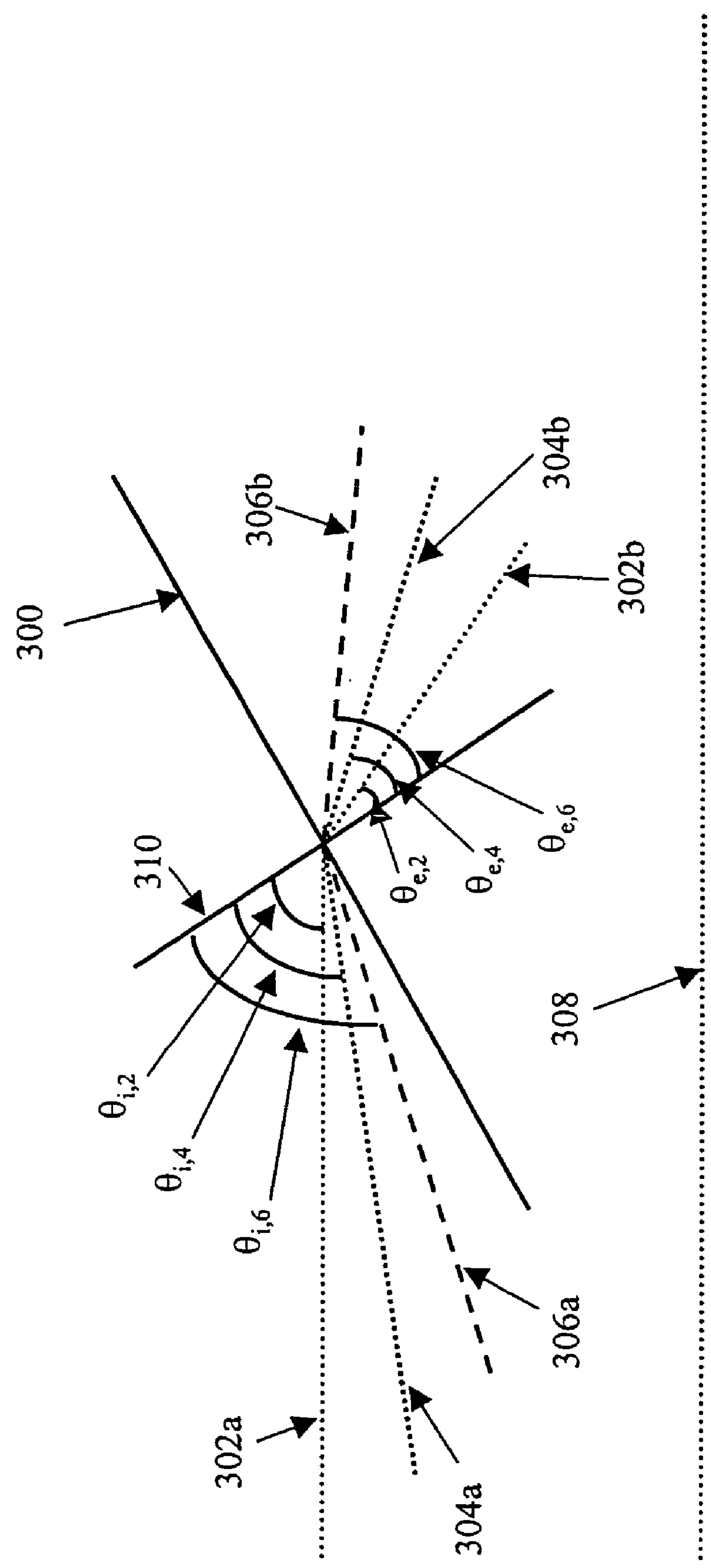
FIGS. 3A–3B are optical ray trace diagrams for radiation incident on various configurations of the direction finding portion of the present invention.
Figure 3B:
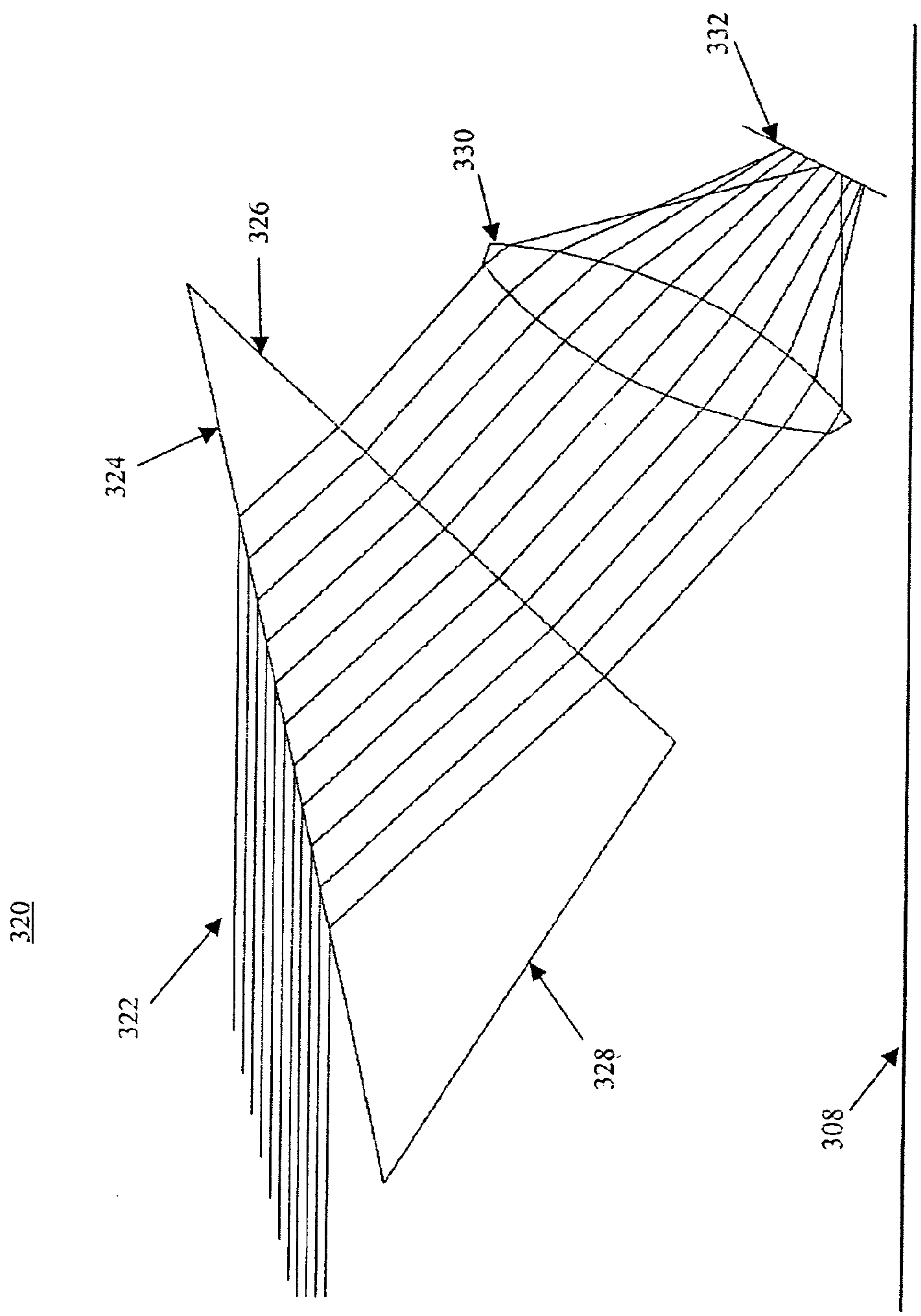

FIG. 3A is an optical ray trace diagram for a portion of a direction finding system in accordance with the related art. Line 300 corresponds to the air/fused silica interface in which ray 302*a* is incident upon the fused silica window system. Ray 302*b* corresponds to ray 302*a* after refraction by the air/fused silica interface 300. Rays 304*a* and 306*a* correspond to rays incident on the air/fused silica interface at increasing angles of incidence. Similarly, rays 304*b* and 306*b* correspond to rays 304*a* and 306*a* after refraction by the air/fused silica interface, respectively. Line 308 is the window system optical axis. The window system optical axis 308, for a symmetric direction finding system mounted coaxially on a guided munition, will be coincident with a longitudinal axis of the guided munition. In other words, the direction finding system is boresighted with the guided munition, which is preferred. Similarly, because ray 302*a* is parallel with the window system optical axis 308, ray 302*a* is boresighted. $\theta_{i,2}$, $\theta_{i,4}$, and $\theta_{i,6}$, correspond to the angle of incidence of rays 302*a*, 304*a*, and 306*a*, respectively, relative to the normal axis 310 of the air/fused silica interface 302. $\theta_{i,2}$, corresponding to boresighted ray 302*a*, is deemed the boresight incidence angle. $\theta_{e,2}$, $\theta_{e,4}$, and $\theta_{e,6}$, correspond to the transmission angles of rays 302*b*, 304*b*, and 306*b*, respectively, relative to the normal axis 310 of the air/fused silica interface 302.

FIG. 3B is an optical ray trace diagram 320 representing the special case when the radiation pulse 322 is parallel to the window system optical axis 308. The angle formed by interfaces 324 and 326 defines a window of the window system in the shape of a prism 328. The angles of prism 328 are such that when the radiation pulse 322 exits the prism, it transmits normally, i.e., perpendicularly, out of the prism 328. Inclusion of a lens 330, as found in one embodiment of the related art, allows collection and focussing of the radiation pulse 322 onto surface 332. Note that if a radiation pulse is not parallel to the window system optical axis 308, the lens 330 collects only a portion of the radiation pulse. Note that surface 332 can correspond to several different objects. In the simplest case, surface 332 corresponds to the front surface of a radiation detector or of a radiation filter placed directly in front of a radiation detector. Alternatively, surface 332 can correspond to the end of an optical fiber. This optical fiber can then be readily routed to a location within the guided munition more amenable to placement of the radiation detectors. As another alternative, surface 332 can correspond to the plane of an optical iris. The optical iris would block a radiation pulse that exits the lens 330 at a high angle, such as one incident on the window system at a high angle relative to the window system optical axis 308. This would be desirable, as it would block stray radiation signals, such as those due to other laser designators reflected from other nearby targets.

Figure 4B:
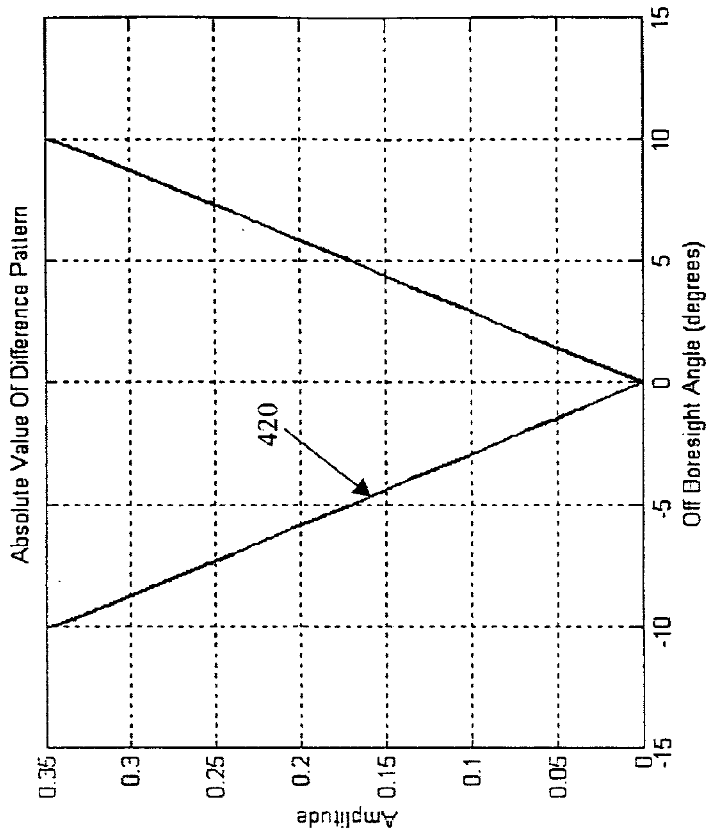
FIGS. 4A–4D are plots of various signals within the direction finding portion of the present invention.
Figure 4A:
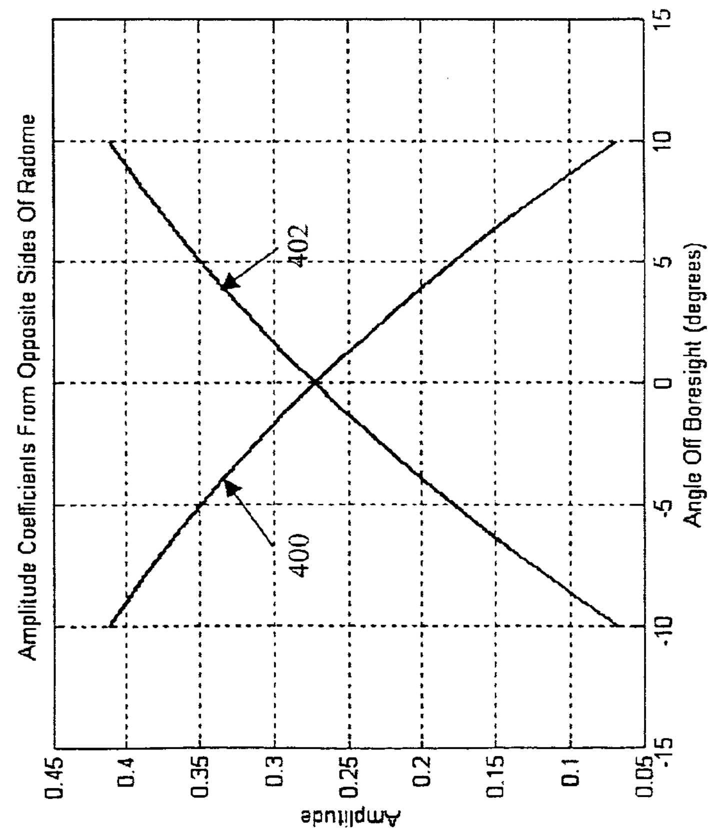
Figure 4D:
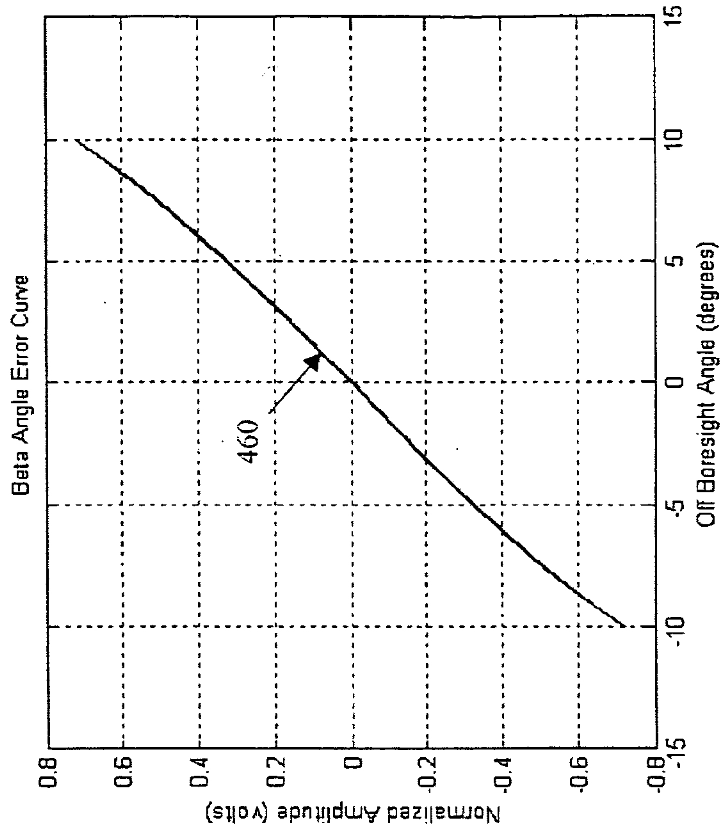
Figure 4C:
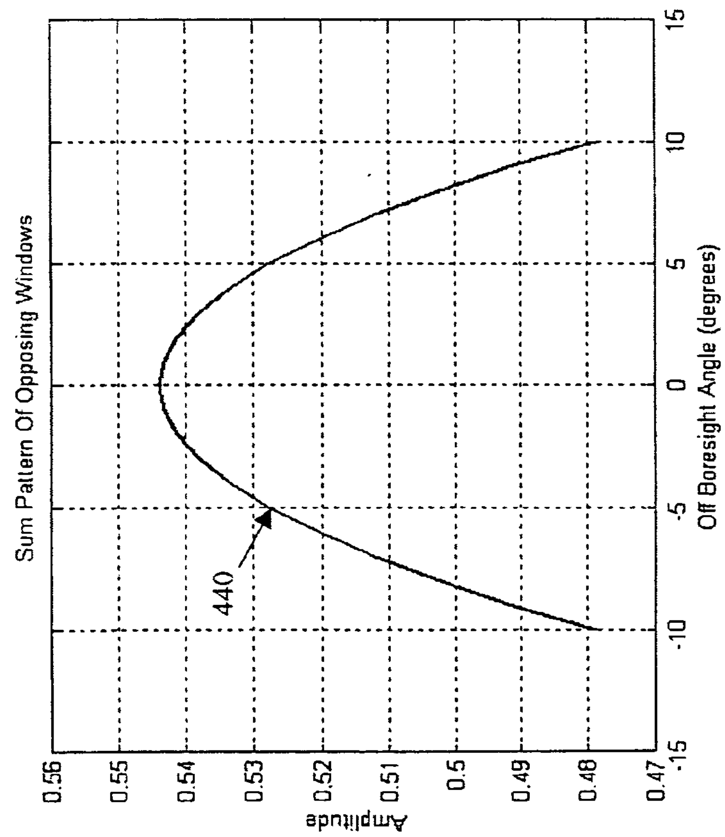

FIGS. 4A–4D illustrate various signals which may be generated within the related art direction finding system. FIG. 4A illustrates the detection signals of an opposing pair of radiation detectors, such as top and bottom radiation detectors or right and left radiation detectors. As an example, curve 400 corresponds to the detection signal of the left radiation detector and curve 402 corresponds to the detection signal of the right radiation detector. In this instance, curve 400, the detection signal of the left radiation detector is strongest when the radiation pulse is incident at an angle to the left off boresight and continuously decreases as the radiation pulse is incident at angles increasingly to the right off boresight. This decrease in the left detection signal is due to the decreasing Fresnel transmittance as the angle of incidence increases from left off boresight to right off boresight. FIG. 4B illustrates the absolute value of the difference 420 between the detection signals of the right and left radiation detectors 400, 402. FIG. 4C illustrates the sum 440 of the detection signals of the right and left radiation detectors. Lastly, FIG. 4D illustrates the difference of the right and left detection signals 420 divided by the sum of the right and left detection signals 440, creating a beta angle error curve 460. Guidance correction systems for guided munitions typically use this beta angle error curve 460, as is well known within the art. Because beta angle error curve 460 was generated using the right and left detection signals, this beta angle error curve 460 corresponds to an azimuth correction signal. If the beta angle error correction was generated using the top and bottom detection signals, the beta angle error curve would correspond to an elevation correction signal. The signals, and all manipulations thereof, may be conducted in either the analog or the digital domain. However, the digital domain is preferred, as implementing additional signal processing, such as noise reduction, is simpler.

Figure 5:
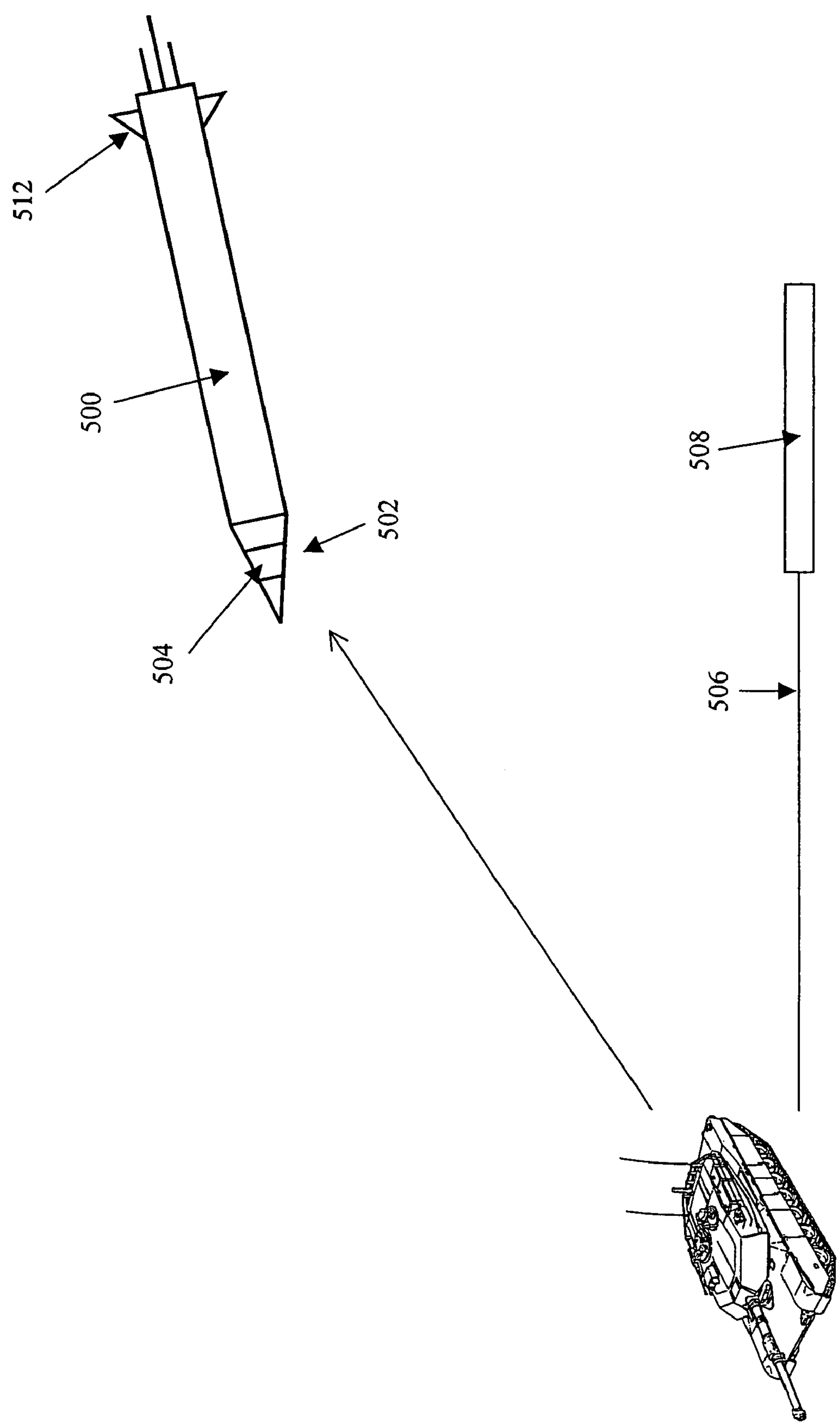
FIG. 5 illustrates application of the related art direction finding system.

The related art guided munition corrects its flight path based upon the beta angle error curve. The process, well known in the guidance art, in abbreviated form, is as follows: upon receiving a radiation pulse, the radiation detectors generate corresponding detection signals. In the case of four radiation detectors, processing of opposing detection signals can determine the relative direction from which the radiation pulse arrived. Once a processor determines this relative direction, the processor compares it to the actual direction of the guided munition and generates a correction signal. The processor then applies this correction signal to control surfaces on the guided munition to modify its flight direction, as illustrated in FIG. 5. The goal of the related art guidance system is thus to alter the direction of the guided munition such that the beta angle error is nulled, i.e., the target is boresighted. The guided munition 500 includes a radome 502 incorporating a window system 504. Radiation 506 from a laser designator 508 reflects off a target 510, toward the guided munition 500. Upon detecting the reflected radiation 506, the guided munition processor applies the correction signal to control surface fins 512. The term control surfaces is general and can include fins 512 as illustrated which rotate in response to the correction signals or small thrusters that fire in response to the correction signals. It should be noted that in the related art direction finding system, the laser designator 508, in the illustrated example, is not part of the apparatus onboard the guided munition 500. This is in contrast to the present invention, in which the laser source is part of the apparatus onboard the guided munition.

As noted above, the related art direction finding system benefits from noise reduction means, such as optical bandwidth filtering and limiting the field of view. Another method of improving performance, and the basis for the present invention, makes use of the speed of the target. The present invention, termed a Doppler tracking optical monopulse (DTOM) system, thus determines both the direction of the target relative to the DTOM system, as well as the speed of the target. The portion of the DTOM system that determines the relative direction of the target from the Doppler tracking system is very similar to that of the related art direction finding system and therefore will not be discussed further. In addition, the DTOM system can determine the distance to the target using transmitted pulse time delay measurements as is well known in the art.

A Doppler shift in frequency is caused by the relative difference in speed and direction of one object with respect to another. In a first case, a first object is traveling directly toward a second, stationary object. In this case, radiation at a given frequency transmitted by the second object and reflected by the first object will be received by the second object at a higher frequency. The magnitude of this frequency shift, known as the Doppler frequency, is a function of the radial speed of the first object, and with appropriate signal processing, the radial speed of the first object can be determined. In a second case, the first object is traveling directly away from the second object. In this second case, radiation at a given frequency transmitted by the second object and reflected by the first object will be received by the second object at a lower frequency. As in the first case, appropriate signal processing of this frequency shift will provide the radial speed of the first object. In a third case, the first object is traveling at a constant distance from the second object. In this case, no change in frequency will be observed because the radial speed of the first object will be zero, even though its angular speed is not zero. This Doppler shift in frequency has been applied to radiation over a wide frequency range. The most common applications may be "radar guns" used to measure one's automobile speed or the speed of a pitcher's fast ball. These systems have been designed to operate using radio frequency (RF) radiation as well as infrared and visible radiation.

Since a Doppler shift is proportional to the transmitted frequency, in the optical domain small differences in radial speed result in large changes in frequency, i.e., Doppler frequencies, compared to RF radar systems. A 2 mph target, for example, provides a Doppler frequency of 2 MHz using a 1.06 μm transmit signal and a 6 MHz Doppler frequency for a transmit signal wavelength of 340 nm. Though such Doppler frequencies are large by RF standards, the wavelength change between the transmitted signal and the Doppler-shifted receive laser signal is quite small. The above Doppler frequencies of 2–6 MHz corresponds to only about $1/43{,}000^{th}$ of an angstrom in wavelength difference between transmitted and return signals. Thus, current optical bandpass filter technology, having a spectral width of several angstroms, is not sufficient to construct optical Doppler bins for speed determination. Nor are high index of refraction materials for prismatic dispersion of Doppler shifted frequencies feasible. A wavelength change of one ¼ of an angstrom would require a crown glass prism approximately four meters thick to displace the radiation 24 μm, the typical spacing between pixels in a CCD. For this reason, a local oscillator (LO) is required to shift the change in frequency down to a frequency range in which such changes in frequency can be more readily measured.

Figure 6:
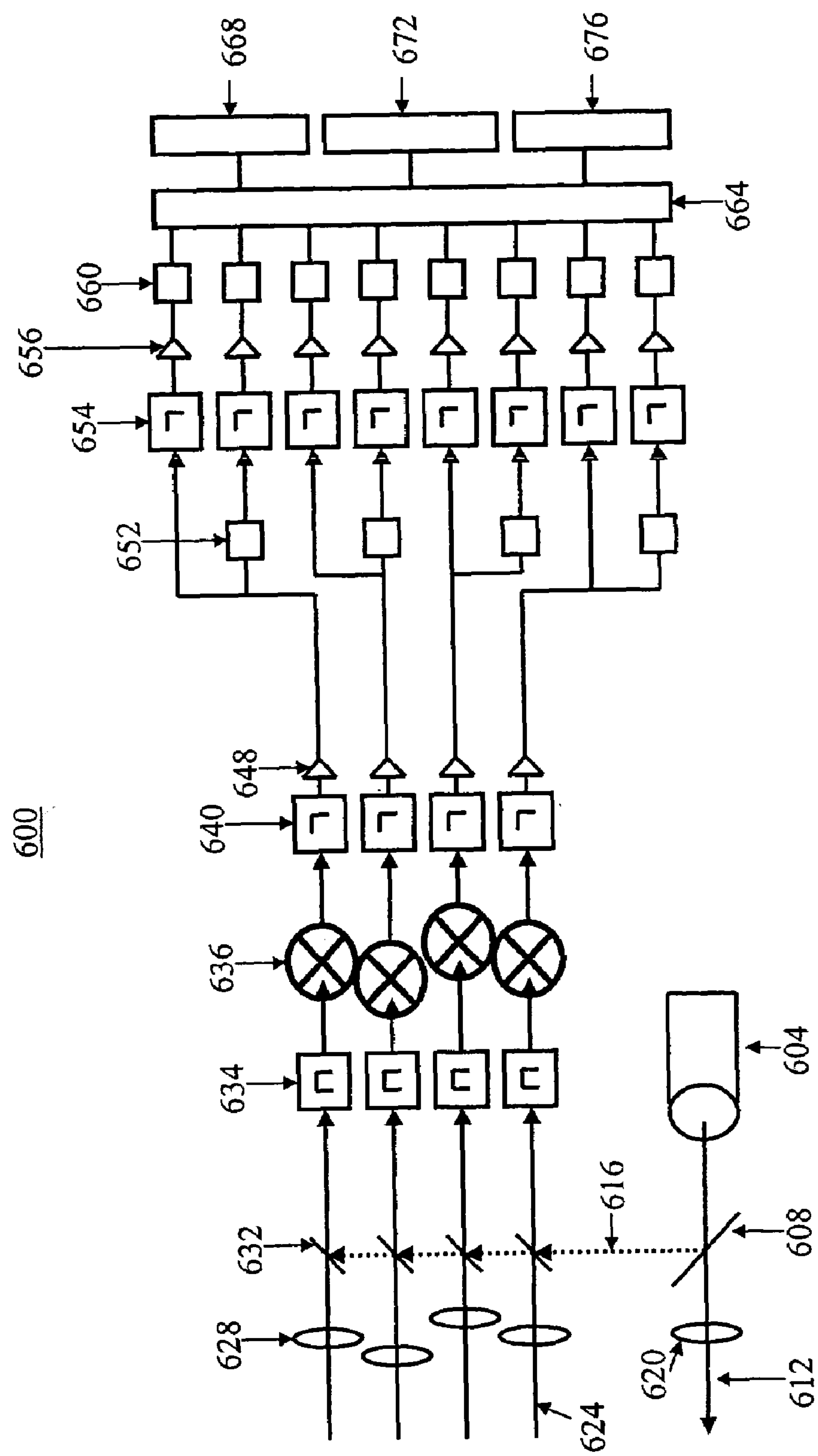
FIG. 6 illustrates a first embodiment of the present invention.

FIG. 6 illustrates a first embodiment of a DTOM system 600. The DTOM system 600 includes a laser source 604. A beamsplitter 608 splits the output of the laser source 604 into a transmit beam 612 and a LO beam 616. The transmit beam 612 then passes through a transmitting window system 620, simplified as a single lens in this figure. The transmit beam 612 then reflects off a target (not illustrated) and is reflected back as a Doppler shifted beam 624. A receiving window system 628, simplified as a group of four lenses in this figure, receives the Doppler shifted beam 624 and directs the Doppler shifted beam 624 through a set of beam combiners 632. The beam combiners 632 combine the LO beam 616 with the Doppler shifted beam 624 and direct the resulting combined beams through optional optical bandpass filters 634, and then onto photomixers 636. The output signals from the photomixers 636 are then filtered by respective lowpass filters 640. The four outputs of the lowpass filters 640 are then amplified by amplifiers 648 and phase shifted by 90 degrees using phase shifting elements 652. The resulting eight signals are then lowpass filtered by lowpass filters 654, amplified by amplifiers 656, and fed to analog to digital (A/D) converters 660. The digital data outputs of the A/D converters 660 are then placed in an appropriate one of the Doppler bins in Doppler bin array 664 based upon the magnitude of the Doppler shift. This digital data from each Doppler bin is then processed by angle processor 668 to determine the azimuth, elevation, and summation signals. The digital data from each Doppler bin is processed by a radial speed processor 672 to determine the radial speed of potential targets. In addition, the digital data from each Doppler bin is processed by a range processor 676 to determine the range from the DTOM system 600 to a potential target. The functions and requirements of several of the elements in the DTOM system 600 will now be examined in greater detail.

Laser Sources (604)

To track a Doppler shifted beam in the optical spectrum, like the RF spectrum, requires coherent phase of the transmit and LO beams 612, 616, i.e., both beams must be spectrally pure. In the simplest case, and as illustrated in FIG. 6, the transmit and LO beams 612, 616 come from the same source, laser source 604. The frequency of a signal is the time derivative of the phase of the signal. By referencing the Doppler shifted beam 624 against the LO beam 616 to measure this phase, coherence is required. The Doppler frequency is then simply the time rate of change of the phase difference between the Doppler shifted beam 624 and the LO beam 616. If coherence were not maintained, it would not be possible to reference the Doppler shifted beam 624 against the LO beam 616 to reveal the Doppler frequency. In other words, one would not know if the observed change in frequency was due to a Doppler shift in the Doppler shifted beam 624, or due to a change in the frequency of the LO beam 616.

One way to ensure a highly coherent laser source 604 is to use an external cavity in conjunction with a diode laser, thereby forming an external cavity diode laser or ECDL. Because the ECDL may not have sufficient power, an amplifier, such as an erbium doped fiber amplifier can be used to further increase the power in the transmit beam. A diffraction grating or mirror can be used to form this external cavity, resulting in a highly coherent laser. The combination of an ECDL and an erbium doped fiber provides a compact, efficient source for the transmit beam, a desirable feature for missile guidance systems.

A diode laser that uses only an internal cavity, i.e., just the facets on either end of the cavity, will support a number of wavelengths. All wavelengths that fit in the diode laser's internal cavity by an integral number of half-wavelengths will undergo gain, and thus will lase. Because many wavelengths will satisfy this lasing requirement, a diode laser may easily lase at twenty to thirty different wavelengths over a spectral range of 5 nm. This corresponds to a frequency width of approximately 3 THz at a wavelength of 780 nm, far too great to provide the coherence needed to accurately detect Doppler shifts in frequency.

By using an external cavity to provide feedback to the diode laser, only one of the many potential wavelengths will have sufficient feedback to lase. This external cavity provides several advantages: First, the threshold current for the diode laser is reduced, thereby creating a more efficient diode laser. Second, by lasing at only one wavelength, the spectral purity of the diode laser is significantly increased. Third, the external cavity can be used to tune the specific wavelength of the diode laser, or to ensure the diode laser operates at a fixed wavelength regardless of operating conditions. This tunability with an external cavity, for example using a grating, can be effected by adjusting the position of the grating, typically with piezoelectric transducers. ECDLs using such designs have shown increases in spectral purity from an initial spectral width in excess of 1 THz down to 10 kHz or less. Such narrow spectral widths provide sufficient coherence to be useful in detecting Doppler shifts in the Doppler shifted beam 624 of a DTOM system 600.

One drawback of an ECDL is the relatively low power output, on the order of milliwatts or tens of milliwatts. To increase this power, the output laser beam can be optically amplified. One common way to implement an optical amplifier is through the use of optical fiber amplifiers, which incorporate rare-earth elements such as erbium as a dopant. These erbium doped optical fiber amplifiers have low noise figures (4–6 dB) while producing significant gain, up to +26 dBm (300 mW) output. The preferred embodiment uses an ECDL for spectral purity and an erbium doped optical fiber amplifier for the laser source 604.

An alternative laser source 604 is a coherent high power laser array, which may be either one- or two-dimensional. Such high power laser arrays have been developed with outputs as high as 25 watts. The spectral widths of these high power laser arrays are approximately 15 kHz or less. This combination of power and spectral width would be compatible with the needs of a DTOM system 600.

The impact of a wide versus a narrow spectral width for the laser source 604 will now be briefly described. A laser source 604 with a wide spectral width will result in a short coherence time, that is, a short time over which the laser source 604 can be considered coherent with itself. For coherent detection of a Doppler shifted beam 624, a long coherence time, i.e., a narrow spectral width, is desired. This long-term phase stability results in long temporal coherence, which is directly related to the distance over which coherent detection can be performed. Equation 3 provides the relation between spectral width and coherence range:

$$\Delta R_C = c/2\Delta F, \quad \text{Eq. 3}$$

where $\Delta R_C$ is the coherence range and $\Delta F$ is the spectral width of the laser source 604. As an example, if a laser source 604 has a 1 kHz spectral width, then it has a potential temporal coherence range of 150 km. However, if the spectral width increases to 10 kHz, the coherence range drops to only 15 km. For guidance systems such as the DTOM system 600, a longer range is clearly preferred, thus driving the need for a spectrally pure laser source 604. As DTOM system ranges will generally be less than 15 km, a spectral width of 10 kHz or less should be sufficient. More likely DTOM system ranges will generally be 5 km or less, thus a spectral width of 30 kHz or less would be sufficient.

A corollary to the coherence range is the temporal coherence. The temporal coherence relates to the desired duration of the laser pulse, the shorter the pulse, the more coherent it will be. An upper limit on the duration of the laser pulse $\Delta t$ is:

$$\Delta t = 1/\Delta w, \quad \text{Eq. 4}$$

where $\Delta w$ is the spectral width of the laser source. With a spectral width $\Delta w$ of 10 kHz, the maximum pulse duration $\Delta t$ is 100 microseconds. Shorter pulse durations can be used, but a trade-off is made as short pulse durations reduce the power in the detected Doppler shifted beam, thus reducing range R.

A Doppler shifted beam 624 mixed with a LO beam 616 will produce beats between all Fourier components of one with the other, thereby providing a method for determining the speed of a target. The maximum beat range of the mixed beams is the highest component of the Doppler shifted beam 624 mixed with the lowest component of the LO beam 616. Mathematically, the beats vary from $f_d - f_{LO} - \Delta f_t$ to $f_d - f_{LO} + \Delta f_{lo}$, where $f_d$ is the frequency of the Doppler shifted beam 624, $f_{LO}$ is the frequency of the LO beam 616 (their difference being the beat or Doppler frequency), $\Delta f_t$ is the laser source 604 spectral width, and $\Delta f_{lo}$ is the LO beam 616 spectral width. As found in the DTOM system 600, the same laser source 604 is used for generating both the transmit and LO beams 612, 616, therefore, $\Delta f_t$ will equal $\Delta f_{lo}$.

Generally, the Doppler or beat frequency should be at least a factor of ten greater than the spectral width of the transmit beam 612. The minimum Doppler frequency expected with the DTOM system 600 is less than 100 MHz for a stationary DTOM system 600 and a slow moving target. However, for a high-speed missile source and/or target, the Doppler frequency will be in excess of 1 GHz. Thus, a laser source 604, including an ECDL and an erbium doped optical fiber amplifier, having a spectral width in the range of 10 kHz or less, will provide sufficient coherence for many scenarios. This is consistent with the coherence range limited spectral width above.

It is instructive to consider the impact of the spectral width of the laser source 604 on the detection of Doppler shifts in frequency. If the laser source 604 has a 10 kHz spectral width, the LO beam 616 will similarly have a 10 kHz spectral width, for a net spectral width of 20 kHz. If the application for the DTOM system 600 requires a radial speed resolution of 1 m/s, this corresponds to a 2 MHz Doppler bin width for a 1.06 μm transmit beam 612 wavelength. Under these conditions, the Doppler bin width of 2 MHz is so large in comparison to the net 20 kHz spectral width, that it appears as a line easily contained within a Doppler bin. For this reason, a laser source 604 having a spectral width of 20 kHz or even 30 kHz will be sufficient for this radial speed resolution.

Atmospheric perturbations in the refractive index of the propagation path caused by turbulence create two issues, the first of which is related to the coherence of the laser source 604. The atmospheric perturbations in refractive index distort the phase front of the transmit and Doppler shifted beams 612, 624, inducing additional spectral width on these beams. This additional spectral width therefore places a lower practical limit on the spectral width of the laser source 604. In other words, a laser source 604 with a 1 kHz spectral width operating with an atmospheric broadening of 50 kHz will provide little benefit over a laser source 604 with a 5 kHz spectral width. Thus, a trade-off in laser source complexity can be made by considering anticipated atmospheric perturbations. Discussion of the second issue caused by atmospheric broadening is deferred until paragraph [0049].

Photomixers (636)

One commonly used method of detecting optical range Doppler shifts employs photodetectors or photodiodes as photomixers 636 or frequency conversion devices. The photodetector changes the THz frequency Doppler shifted beam directly to a frequency corresponding to the Doppler frequency. For photomixers 636, the Doppler shifted and LO beams 624, 616 fall, and thus mix, on the surface of the photomixers 636. The outputs of the photomixers 636 correspond to the difference of the Doppler shifted and LO beams 624, 616, i.e., the Doppler frequency.

The physics of this photomixing operation is due to the photodetector producing a current proportional to the total power incident upon its surface. This is the fundamental theorem of photodetection, which states that if radiation of a constant power P is incident upon an ideal photodetector, then electrons will be produced at an average rate given by:

$$r = \eta P / h\nu, \quad \text{Eq. 5}$$

where $\eta$ is the quantum efficiency (the fraction of incident power effective in producing emitted electrons), h is Plank's constant, and $\nu$ is the incident beat frequency due to mixing of the Doppler shifted and LO beams 624, 616. Important for Doppler shifted applications is that if the incident field is time varying, the average rate of electron emissions will vary with time in the same manner. Thus, the current from the photodetector varies at the Doppler frequency.

This mixing process using a photodetector will now be explored in greater detail. The photodetector acts as one of the photomixers 636 producing a current at the beat frequency, that is, the difference between the Doppler shifted and LO beams 624, 616, which corresponds to the Doppler frequency. Though beats are created in a variety of ways and the electric field action over the photodetector surface is frequency addition, due to the fundamental theorem of photodetection, the addition of frequencies leads to a product because it is power that creates electron emission, not voltage (electric fields are voltage).

Mathematically, the following occurs: Consider first a photodetector having a surface area A with constant quantum efficiency $\eta$ over its surface. Further, two plane, constant amplitude waves whose incident E-vectors lie in the plane of the photomixer surface and parallel to each other are incident on the photodetector. With the LO beam field amplitude defined as $E_{LO}$ and the Doppler shifted beam field as $E_S$, the resulting field at the surface of the photodetector is:

$$E=E_{LO}\cos\omega_{LO}t+E_s\cos\omega_s t \quad \text{Eq. 6}$$

The average rate of electron emission in the photodetector from Eq. 5 multiplied by the charge of an electron, e, gives the photodetector current:

$$i(t)=e\eta P/h\nu \quad \text{Eq. 7}$$

By using the impedance of free space, $z_o$, Ohm's law, I=E/Z, and that power $P=I^2 z_o$, then $P(t)=AE^2/z_o$, making the photodetector current:

$$i(t)=e\eta AE^2/z_o h\nu \quad \text{Eq. 8}$$

Substituting Eq. 6 into Eq. 8 leads to:

$$i(t)=e\eta A(E_{LO}\cos\omega_{LO}t+E_s\cos\omega_s t)^2/z_o h\upsilon \quad \text{Eq. 9}$$

$$=[e\eta A/z_o h\upsilon][0.5E_{LO}^2(1+\cos 2\omega_{LO}t)+0.5E_s^2(1+\cos 2\omega_s t)+E_{LO}E_s\cos(\omega_s-\omega_{LO})t+E_{LO}E_s\cos(\omega_s+\omega_{LO})t] \quad \text{Eq. 10}$$

Of the terms in Eq. 10, those at $\omega_s+\omega_{LO}$, $2\omega_s$, and $2\omega_{LO}$ can be ignored because they outside the photodetector's capacity to respond. In addition, they would lie outside the bandpass filters 640*a*–*d* meant to reject frequencies far from those desired. The net result is that only the term corresponding to the difference in the Doppler shifted and LO beams 624, 616, $\omega_s-\omega_{LO}$, is left, i.e., the Doppler frequency.

The maximum expected Doppler frequency will determine the required bandwidth of the photomixers 636. If the maximum Doppler frequency is to be sampled by A/D converters 660 at the minimum Nyquist rate, then the bandwidth of the photomixers 636 must be at least twice the Doppler frequency. As an example, if the closing radial speed is 500 m/s, the resulting Doppler shift for a 1.06 μm transmit beam 612 is approximately 1 GHz, requiring the photomixers 636 to have a 2 GHz bandwidth. This also places a lower limit on the duration of the laser pulse, equal to the reciprocal of the bandwidth of the photomixers 636. Assuming the photomixers 636 have a 2 GHz bandwidth, the laser pulse must be at least 500 pSec. As such a short duration pulse would lead to very low levels of return power, and thus short detection ranges, the duration of the pulse width in the preferred embodiment will be longer than this.

As will be seen in the second and third embodiments of the DTOM system below, the use of either a second local oscillator or an acousto-optic modulator (AOM) will reduce the magnitude of the Doppler frequency. By reducing the magnitude of the Doppler frequency, the bandwidth of the photomixers 636 can be reduced, thereby decreasing noise. The bandwidth of the photomixers 636 cannot be reduced too much, or the waveform of the signal produced by the photomixers 636 will be distorted due to the very short duration of the Doppler shifted and LO beams 624, 616.

In the above description, it is assumed the phase fronts of the Doppler shifted and LO beams 624, 616 are matched at the photomixer surface (i.e., the angle between their Poynting vectors is zero) in order to maximize mixing efficiency. To further maximize mixing efficiency, the Doppler shifted and LO beams 624, 616 should overlap and have equal spot sizes. One of skill in the art will understand the implications these place on the optical design of the DTOM system 600.

Transmitting and Receiving Window Systems (620, 628)

Focusing optics, part of both the transmitting and receiving window systems 620, 628, will be required to shape and reduce beamwidth for both the transmitted and Doppler shifted beams 612, 624. Proper beam shaping will help to reduce the amount of transmit beam power required for a given range. Multiple transverse modes will be sustained in the cavity of a diode laser. The most desirable of these modes is the $TEM_{00}$ as its flux density is ideally Gaussian over the beam's cross section. The $TEM_{00}$ mode has no phase shifts in the electric field across the beam as there are in other modes, leading to greater spatial coherence. Further, the $TEM_{00}$ mode will result in a beam having the smallest possible angular divergence. Lastly, a $TEM_{00}$ mode beam can be focused down to the smallest possible spot size compared to other modes.

When the DTOM system 600 is part of a guidance system located on a missile, the location of the transmitting and receiving window systems 620, 628 is critical. As the transmit beam 612 is a single beam, one logical place to locate the transmitting window 620 is at the tip of the radome. This location, however, is impractical as the tip can rapidly heat to temperatures in excess of 3100° F., the melting point of fused silica. For this reason, the preferred embodiment places the transmitting window 620 in an offset location with respect to the tip of the radome.

To ensure adequate signal from the Doppler shifted beam 624, the receiving window system 628 should be as large as possible. For a given transmit beam power, a larger receiving window system 628 will result in longer detection ranges as more of the Doppler shifted beam 624 will be received. However, several factors weigh against large receiving window systems 628. Among these factors are the constraints of the radome within which the DTOM system 600 is placed. A very large receiving window system 628 may require a radome having a larger diameter, thereby negating some of the benefits of a sleek radome. Weight, cost, and structural integrity may also place an upper limit on the receiving window system size.

Atmospheric turbulence also places an upper limit on the size of the receiving window system 628. The effective diameter of the receiving window system 628 represents the physical aperture diameter at which a photomixed signal is reduced by 3 dB from the expected level in the absence of turbulence. A DTOM system 600 having an effective diameter of 1 cm, would have a range of approximately 14 km when the atmospheric structure function is $10^{-14}$, a typical upper limit. It should be noted that range is inversely proportional to the effective diameter, thus the smaller the aperture, though contrary to desires for maximizing received power, the longer range available for coherent detection.

Operation of the DTOM System

The DTOM system 600 operates by generating an optical pulse using the laser source 604. This optical pulse is split into two portions by the beamsplitter 608, the first portion is the transmit beam 612 while the second portion is the LO beam 616. The transmit beam 612 passes through the transmitting window system 620 and hence to the target. The target reflects the transmit beam 612 and in the process causes a Doppler shift in the frequency of the transmit beam 612. As noted above, this Doppler shifted beam 624 will have a higher frequency if the target is moving toward the DTOM system 600 and a lower frequency if the target is moving away from the DTOM system 600. A portion of the Doppler shifted beam 624 will be reflected back to the DTOM system 600 and fall upon the receiving window system 628. The receiving window system 628 directs the Doppler shifted beam 624 to a series of beam combiners 632, which combine the Doppler shifted beam with the LO beam 624, 616. The combined Doppler Shifted/LO beams 624, 616 are filtered by optional optical bandpass filters 634, and then fall upon the surface of the photomixers 636. Each of the photomixers 636 mix the combined Doppler shifted/LO beams 624, 616 to produce a corresponding signal at the Doppler frequency. A corresponding RF lowpass filter 640, to reduce noise and provide additional resistance to potential optical counter-measures, filters each photomixer signal. The RF lowpass filters 640 also serve to block the higher frequency sidebands of the mixed Doppler shifted/LO beams 624, 616 at $\omega_s+\omega_{LO}$, $2\omega_s$ and $2\omega_{LO}$. These filtered signals are subsequently amplified by corresponding amplifiers 648, which, due to the frequencies involved, can be video amplifiers for low speed applications. Each of these amplified signals is then split with one portion undergoing a 90 degree phase shift via corresponding phase shifting elements 652, creating four I signals and four Q signals. The resulting eight signals are then lowpass filtered by lowpass filters 654 and then amplified by corresponding amplifiers 656. These filtered and amplified signals are then converted into digital data by corresponding A/D converters 660. The outputs of the A/D converters 660 are then placed in the appropriate Doppler bin 664 based upon the magnitude of the Doppler shift.

The angle processor 668 determines the azimuth, elevation, and summation signals much like the related art direction finding system described above but with an added feature. Two objects can have the same azimuth and elevation angles but different radial speeds, such as a moving tank against a stationary background. By using the Doppler frequency aspect of the signals, the DTOM system 600 can detect the moving tank relative to the stationary background, even though both have the same azimuth and elevation angles. This radial speed discrimination is based upon the angle processor 668 processing all of the digital data in a single Doppler bin to generate azimuth, elevation, and summation signals for any object moving at the radial speed corresponding to the given Doppler bin. It is the addition of the Doppler frequencies that permits the DTOM system 600 to discriminate the azimuth and elevation angles of the moving tank from the stationary background. The DTOM system 600 thus measures target radial speed as a means for discriminating a moving target from stationary clutter as other radar systems do. However, the DTOM system 600 also but measures the azimuth and elevation angles after Doppler processing such that the target azimuth and elevation angles may also be discriminated by the target's radial speed. In particular, it is the measuring of the Doppler frequency and then the target azimuth and elevation angles in series that sets the DTOM system 600 apart from other radar systems that conduct such processing in parallel.

The radial speed processor 672 uses the signals in each Doppler bin to determine the presence of a potential target traveling at a radial speed corresponding to the Doppler bin. The DTOM system 600 is therefore able to track multiple targets at multiple radial speeds as the digital data due to each target will fall in different Doppler bins. Further, by creating both I and Q components of the signals, the Doppler frequency shifts can be determined to be positive or negative. Such positive or negative determination is required to know if the target is advancing toward, or retreating, from the DTOM system 600. In each case, by knowing the frequency of the laser source 604 and the Doppler frequency (due to which Doppler bin), the radial speed of the target is determined.

This radial speed determination is preferably made by using Doppler bins, each Doppler bin corresponding to a range of radial speeds as noted above in paragraph [0038]. Depending upon the radial speed resolution required and the wavelength of the laser source 604, the width of each Doppler bin can be determined. As noted above, an application having a 1 m/s radial speed resolution with a 1.06 μm wavelength laser source 604 will require a Doppler bin width of 2 MHz. This follows from:

$$D_W=2S_R/\lambda, \qquad \text{Eq. 11}$$

where $D_W$ is the Doppler bin width, $S_R$ is the desired radial speed resolution, and $\lambda$ is the wavelength of the laser source 604. Once the radial speed of the target is determined, moving targets can readily be discriminated from stationary backgrounds, clutter, unwanted targets, or countermeasures.

In addition, the range processor 676 of the first embodiment DTOM system 600 determines the range from the DTOM system 600 to a potential target. Range determination is made by the range processor using transmitted pulse time delay measurements as is well understood in the optical range finding art.

The first embodiment DTOM system 600 illustrated in FIG. 6 is limited in its application due to the Doppler frequencies it can measure. This first embodiment would be feasible for a stationary guidance system and a slow moving target, such as a ground vehicle or a ship. If the laser source spectral width is sufficiently small, the first embodiment DTOM system 600 could be used for somewhat faster targets, such as rotary winged aircraft.

Figure 7:
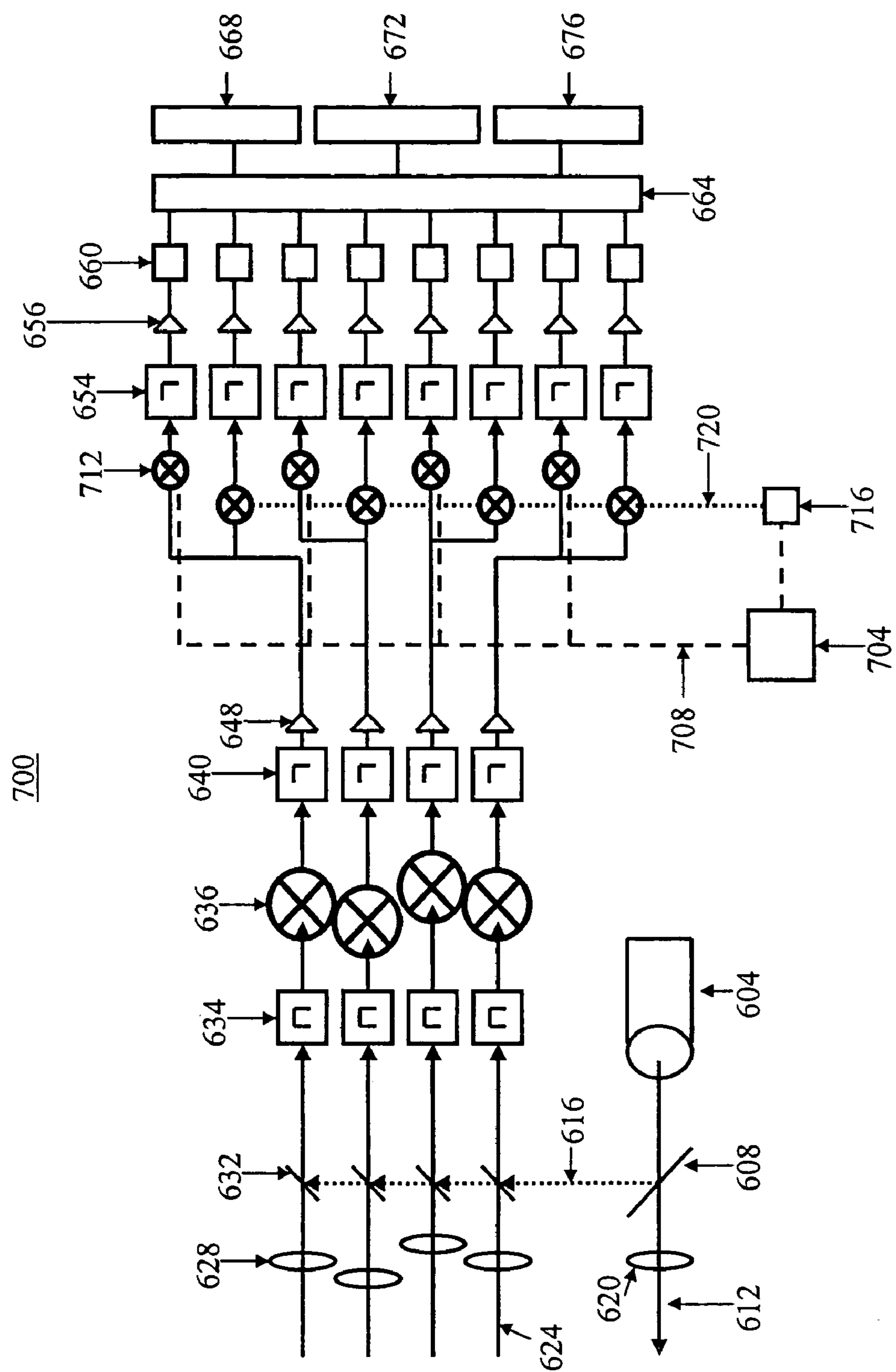
FIG. 7 illustrates a second embodiment of the present invention.

The second embodiment DTOM system 700, illustrated in FIG. 7, finds application over a far wider range of Doppler frequencies and thus radial speeds. The second embodiment DTOM system 700 includes many of the same elements as the first embodiment DTOM system 600, and thus common elements will be given common identifiers. That portion of the second embodiment DTOM system 700 that differs from the first embodiment DTOM system 600 will now be described.

The DTOM system 700 includes an oscillator 704 that generates a second LO signal 708. This second LO signal 708 is then mixed with the amplified signals from amplifiers 648 in mixers 712. A portion of the second LO signal 708 is phase shifted by 90 degrees by phase shifting element 716. This phase shifted second LO signal 720 is similarly mixed with the amplified signals from amplifiers 648 in mixers 712. The output signal from each of the mixers 712 is then filtered by the corresponding lowpass filter 654. The resultant signals are then amplified by amplifiers 656 prior to undergoing A/D conversion by A/D converters 660. The digital data output by the A/D converters 660 are then processed as with the first embodiment DTOM system 600 to generate azimuth, elevation, summation, radial speed range data.

The second embodiment DTOM system 700 operates as follows. The operation is generally identical with the first embodiment DTOM system 600 through the amplification stage by amplifiers 648. Due to the potentially very high Doppler frequencies, much higher bandwidth amplifiers 648 must be employed than in the first embodiment. The frequency of the second LO signal 708 generated by the oscillator 704 is generally within the RF range and will be determined by the expected radial speeds. The oscillator 704 is preferably a variable frequency oscillator such that a single design for the DTOM system 700 may be used in many applications with little additional complexity. A voltage controlled oscillator (VCO) and a frequency synthesizer are examples of variable frequency oscillators. Use of a variable frequency oscillator permits use of a fixed range of Doppler bins, and also allows narrower, higher resolution, Doppler bins.

The second LO signal 708, or a phase shifted second LO signal 720 is mixed with the amplified signals from amplifiers 648 in mixers 712. While the mixing in photomixers 636 is done in the optical spectrum, mixers 712 are in the RF spectrum and thus do not use photodetectors for the mixing process. Mixers 712 may operate using either electrical signals via microstrip conductors, or electromagnetic waves via waveguides. In the preferred embodiment, the mixers 712 operate using electrical signals, not electromagnetic waves.

Each of the signals created by mixing second LO signal 708 or the phase shifted second LO signal 720 with the signals from amplifiers 648 is then lowpass filtered by the corresponding lowpass filter 654. This filtering removes the unwanted harmonics created in the mixing process in mixers 712 and reduces noise power. The expected range of Doppler frequencies and the Nyquist sampling rate of the A/D converters 660 determines the cutoff frequency for low pass filters 712. Amplifiers 656 amplify the lowpass filtered signals from the lowpass filters 712. The expected range of Doppler frequencies and the Nyquist sampling rate similarly determines the bandwidth of amplifiers 712. The A/D converters 660 convert the analog I and Q signals for determining if the Doppler frequency shifts are positive or negative, as well as for determining which Doppler bin the resultant digital data should be placed within. The subsequent digital processing by angle processor 668, radial speed processor 672, and range processor 676 determine the azimuth, elevation, summation, radial speed, and range like the first embodiment DTOM system 600. As with the first embodiment, the use of the Doppler bins permits discriminating a moving target from a stationary background when both are at the same azimuth and elevation relative to the DTOM system 700.

The reason for the second LO mixing stage in the second embodiment DTOM system 700 is readily apparent when one considers the possible range of Doppler frequencies. For a transmit wavelength of 1.06 μm, the Doppler frequency is 630 MHz/Mach number in closing radial speed. Thus, the Doppler frequency could easily exceed L-band and approach X-band for high-speed targets. Such high Doppler frequencies generally cannot be adequately resolved using the single LO mixing stage of the first embodiment DTOM system 600.

Figure 8:
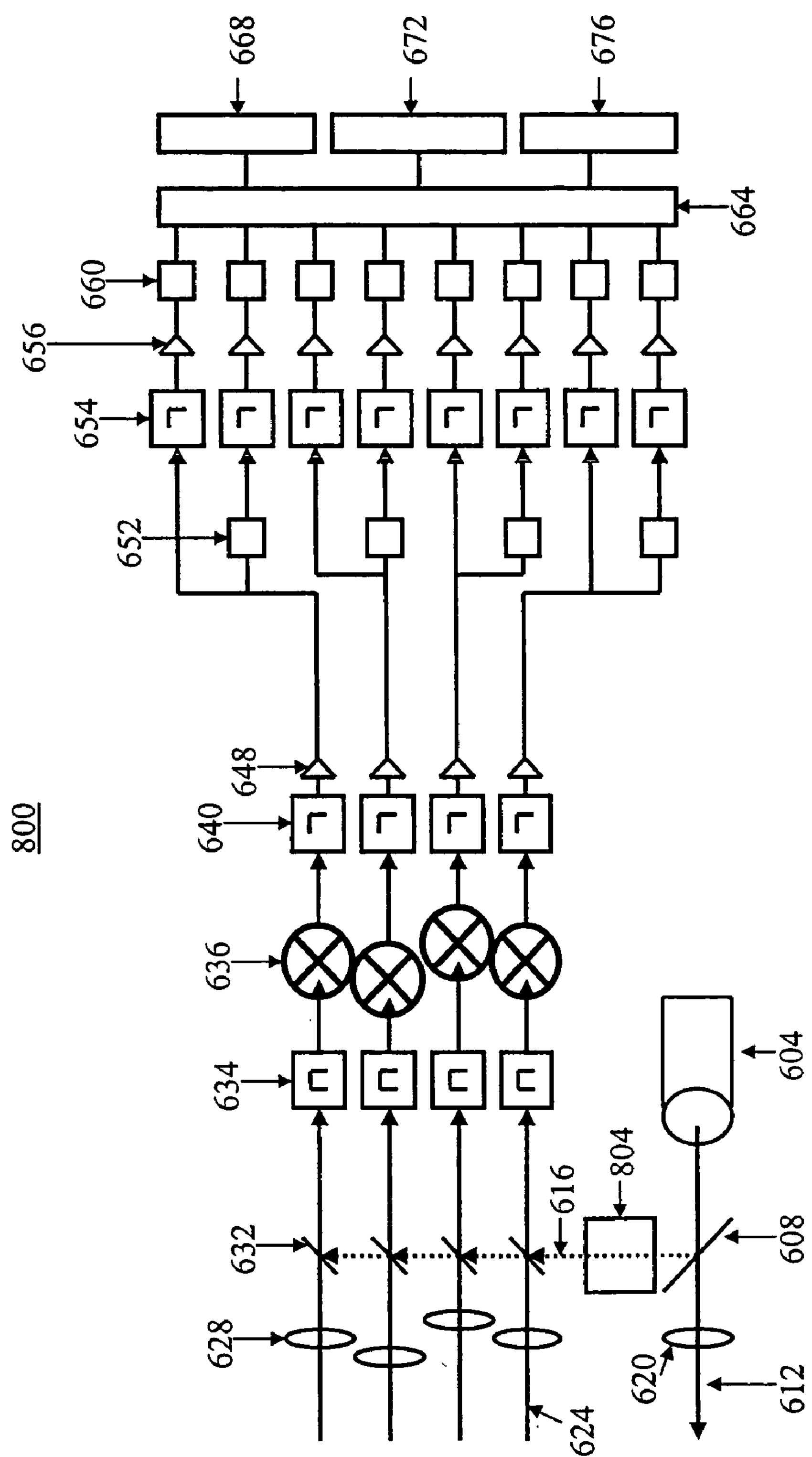
FIG. 8 illustrates a third embodiment of the present invention.

FIG. 8 illustrates a DTOM system 800 according to a third embodiment. As with the second embodiment DTOM system 700, the third embodiment DTOM system employs many of the same components as the first embodiment and thus only the differences will be discussed. Instead of using an oscillator 704 to frequency shift the Doppler frequency, an acousto-optic modulator (AOM) 804 shifts the frequency of the LO beam 616. The anticipated magnitude of the Doppler frequency determines the magnitude of the desired frequency shift in the LO beam 616 induced by the AOM 804.

The third embodiment DTOM system 800 operates as follows: After the beamsplitter 608 creates the transmit and LO beams 612, 616, the frequency of the LO beam 616 is modulated by the AOM 804. If the target is approaching the DTOM system 800, the frequency of the LO beam 616 is increased by the AOM 804, conversely, if the target is retreating from the DTOM system 800, the frequency of the LO beam 616 is decreased. The magnitude of the frequency increase or decrease is based upon the anticipated speed of the target, i.e., the anticipated Doppler frequency. For example, if the target is approaching the DTOM system 800 at an anticipated speed of Mach 0.2, the AOM 804 would increase the frequency of the LO beam 616 by 126 MHz. Assuming the target had an actual speed of approximately Mach 0.3, the combined frequency shifted LO and Doppler shifted beams 616, 624 will produce a Doppler frequency of approximately 63 MHz. This frequency is well within the sampling rate of many A/D converters. The net effect of using the AOM 804 is that lower cost A/D converters can be used without sacrificing target discrimination, even at higher target speeds that are incompatible with the first embodiment DTOM system 600. A DTOM system 800 with an AOM 804 providing a frequency shift of 100 MHz and an A/D converters 660 capable of handling frequencies to 100 MHz would cover twice the range of target speeds of a DTOM system 600 that does not include an AOM 804, but employs the same A/D converters 660.

Figure 9:
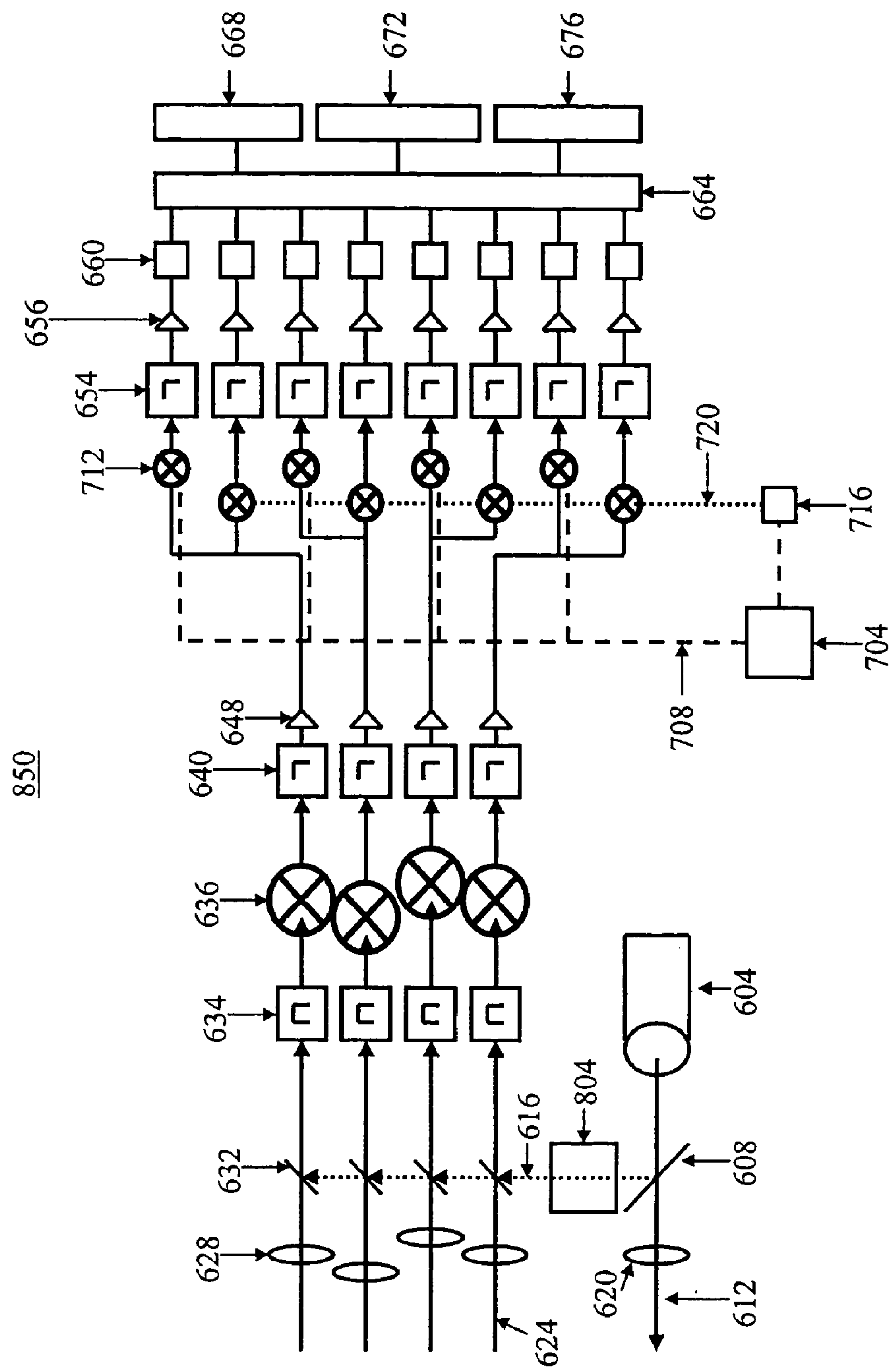
FIG. 9 illustrates a fourth embodiment of the present invention.

As the magnitude of the frequency shift imposed by the AOM 804 is limited, the fourth embodiment DTOM system 850, illustrated in FIG. 9, includes both an AOM 804 and an oscillator 704. The advantage of using both the AOM 804 and the oscillator 704 is that the oscillator 704 need not be a variable frequency oscillator as was preferred in the second embodiment DTOM system 700. Alternatively, if the oscillator 704 is a variable frequency oscillator, discrimination over an even wider range of target speeds is possible. Operation of the fourth embodiment DTOM system 850 is a combination of that of the second and third embodiment DTOM systems 700, 800, and therefore will not be described further.

A fifth embodiment DTOM system is a variation on the fourth embodiment DTOM system 850 and thus is not illustrated. In the fifth embodiment DTOM system, the AOM 804 is located immediately after the laser source 604. By locating the AOM 804 immediately after the laser source 604, the frequency of both the transmit and LO beams 612, 616 is shifted. As with the third and fourth embodiment DTOM systems 800, 850, the fifth embodiment provides greater flexibility and covers a wider range of target speeds as compared to the first or second embodiment DTOM systems 600, 700.

Figure 10:
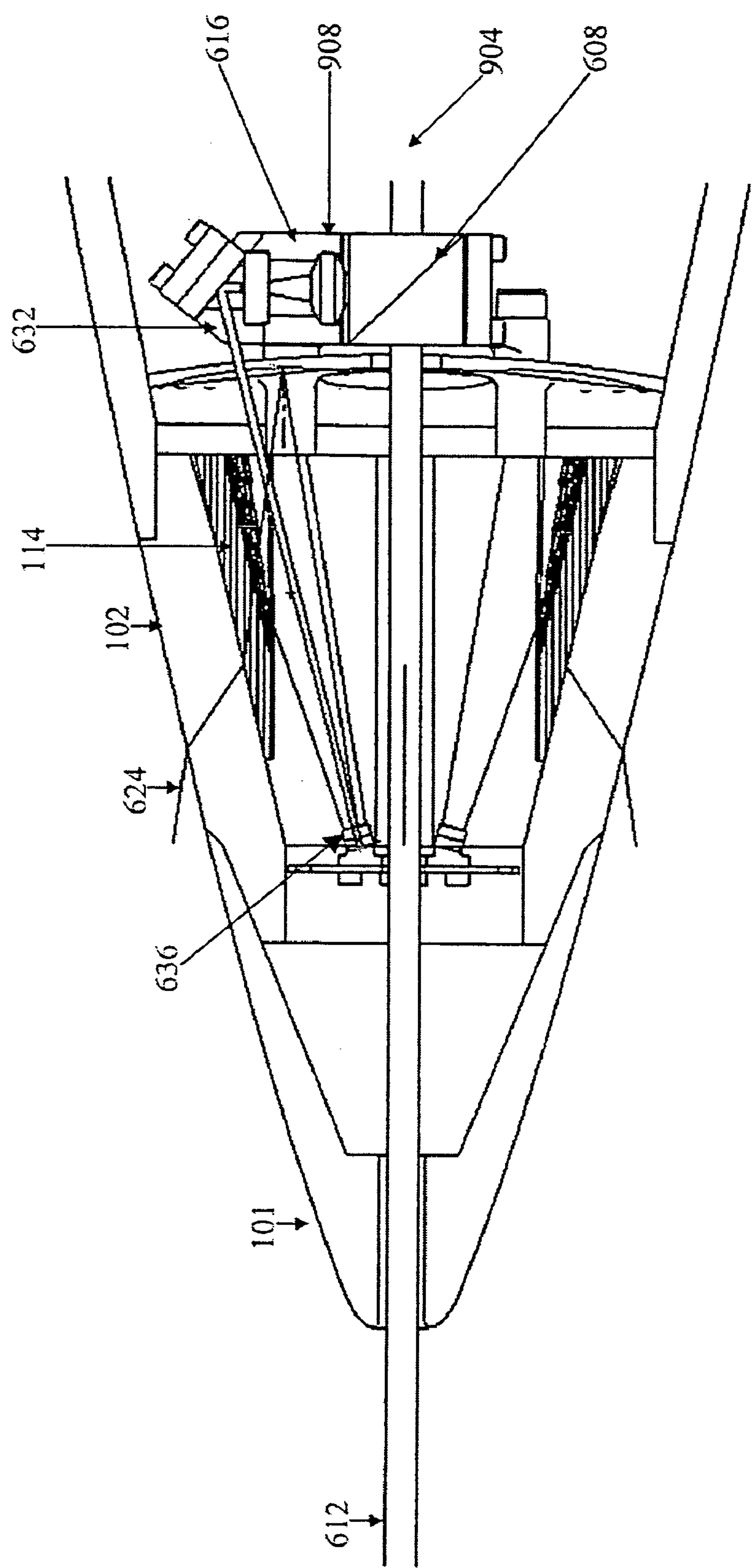
FIG. 10 illustrates a sixth embodiment of the present invention.

FIG. 10 illustrates the physical embodiment of a DTOM system 900 according to a sixth embodiment showing the optical arrangement of the various elements. Because most of the elements in the physical embodiment of the sixth embodiment are in common with the previous FIGS., common identifiers will be used. The sixth embodiment DTOM 900 includes only a single photomixer 636 as opposed to the four photomixers 636 used in the previous embodiments. A single photomixer 636 is sufficient for determining the radial speed of a multiple targets, but cannot provide azimuth and elevation information for multiple targets. The DTOM system 900 includes a radome 101 that houses much of the DTOM system optical components. A laser source, not illustrated, produces a laser beam 904 that is split by a beamsplitter 608 into a transmit beam 612 and a LO beam 616. After the transmit beam 612 is reflected and Doppler shifted by a target, not illustrated, a receiving window system 102 receives the Doppler shifted beam 624. Light baffles 114 are included to limit the field of view and thus block stray light and/or potential countermeasures. The Doppler shifted beam 624 is then reflected by beam combiner 632. In this case, the beam combiner 632 is a parabolic mirror that includes a small aperture through which the LO beam 616 passes. A LO beam conditioner 908 condenses the LO beam 616 and guides it through the aperture in the beam combiner 632. Both the Doppler shifted beam 624 and the LO beam 616 illuminate the surface of a photomixer 636. The remainder of the electronics used in processing the photomixed signal is not illustrated.

Detection Range and Received Power

Because a laser beam is electromagnetic radiation, the traditional radar range equation applies:

$$P_r=(P_tG_t/4\pi R^2)\times(\sigma/4\pi R^2)\times(\pi D^2/4)\times\eta_{atm}\,\eta_{sys}, \qquad \text{Eq. 12}$$

where $P_r$=received power, $P_t$=transmit power, $G_t$=transmit gain, R=target range, D=aperture diameter. $\eta_{atm}$=atmospheric transmission factor and $\eta_{sys}$=system transmission factor, both of which are transmission coefficients that incorporate losses due to reflections and absorption. Lastly, $\sigma$=cross section of the target. The transmit gain $G_t$ is given by:

$$G_t=4\pi/\theta_T^2. \qquad \text{Eq. 13}$$

The usual beamwidth form is modified by $K_\alpha$, the aperture illumination constant, in a conversion from the traditional radar domain to the optical domain at a laser wavelength of $\lambda$:

$$\theta_T=K_\alpha\lambda/D. \qquad \text{Eq. 14}$$

Through substitution, equation 12 becomes:

$$P_r=P_t\sigma D^4\,\eta_{atm}\,\eta_{sys}/16R^4K_\alpha^2\lambda^2. \qquad \text{Eq. 15}$$

Figure 11:
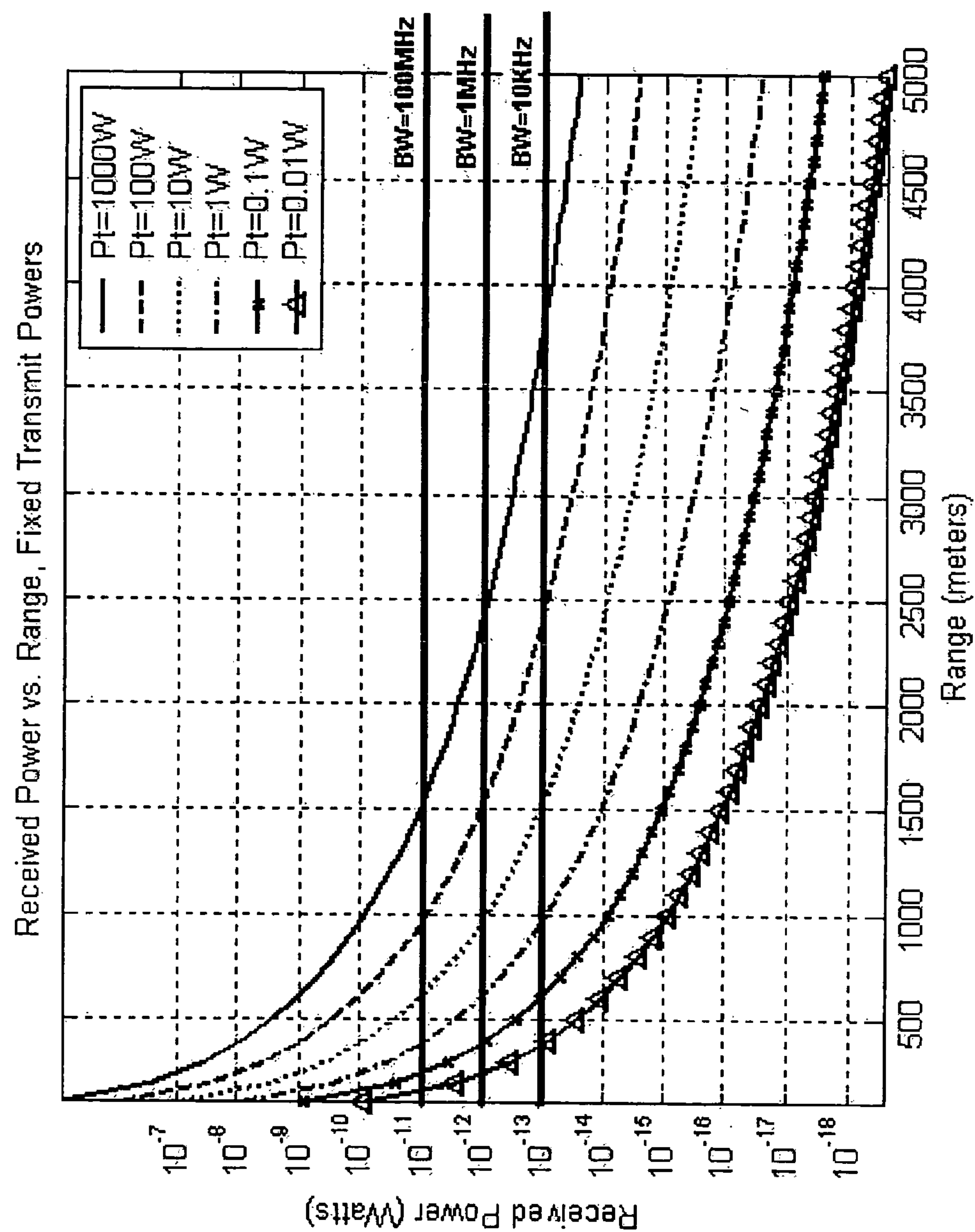
FIG. 11 is a plot showing range as a function of transmit power.

The following example calculations assume the following: A clear day, resulting in $\eta_{atm}$=0.5 dB/km at a wavelength $\lambda$ of 1.06 µm. The transmitting and receiving window system losses are combined as $\eta_{sys}$=0.5, with an aperture diameter D=1 cm. The cross section is approximately 10% of the area of the target area. With a target having an area of 4 $m^2$, the cross section $\sigma$=0.4 $m^2$. The factor $K_\alpha$, used to account for the difference between radar and optical domains in beamwidth, is $1/e^2$ found when considering optical power, versus ½ when considering power in radar. This results in $K_\alpha$=1.27. Lastly, because the power from laser sources can vary from a few milliwatts to hundreds of watts, FIG. 11 provides a series of curves based upon the transmit power $P_t$. FIG. 11 also includes lines indicating where photodiode detector noise equivalent power (NEP) lies for current state-of-the-art silicon photodetectors nearing $2\times10^{-15}$ W/(Hz)$^{1/2}$ as a function of detector bandwidth.

FIG. 11 shows the range for a laser source 604 having a transmit power $P_t$ of 100 W meets the photodiode NEP from 2.5 km down to 1 km depending on the detector bandwidth. As expected, the range is a strong function of transmit power $P_t$, with a 10 W laser source, the range varies from 1.5 km to 0.5 km. To provide a confidence margin in the detection process, the actual received power should be approximately 10 dB higher than illustrated.

Figure 12:
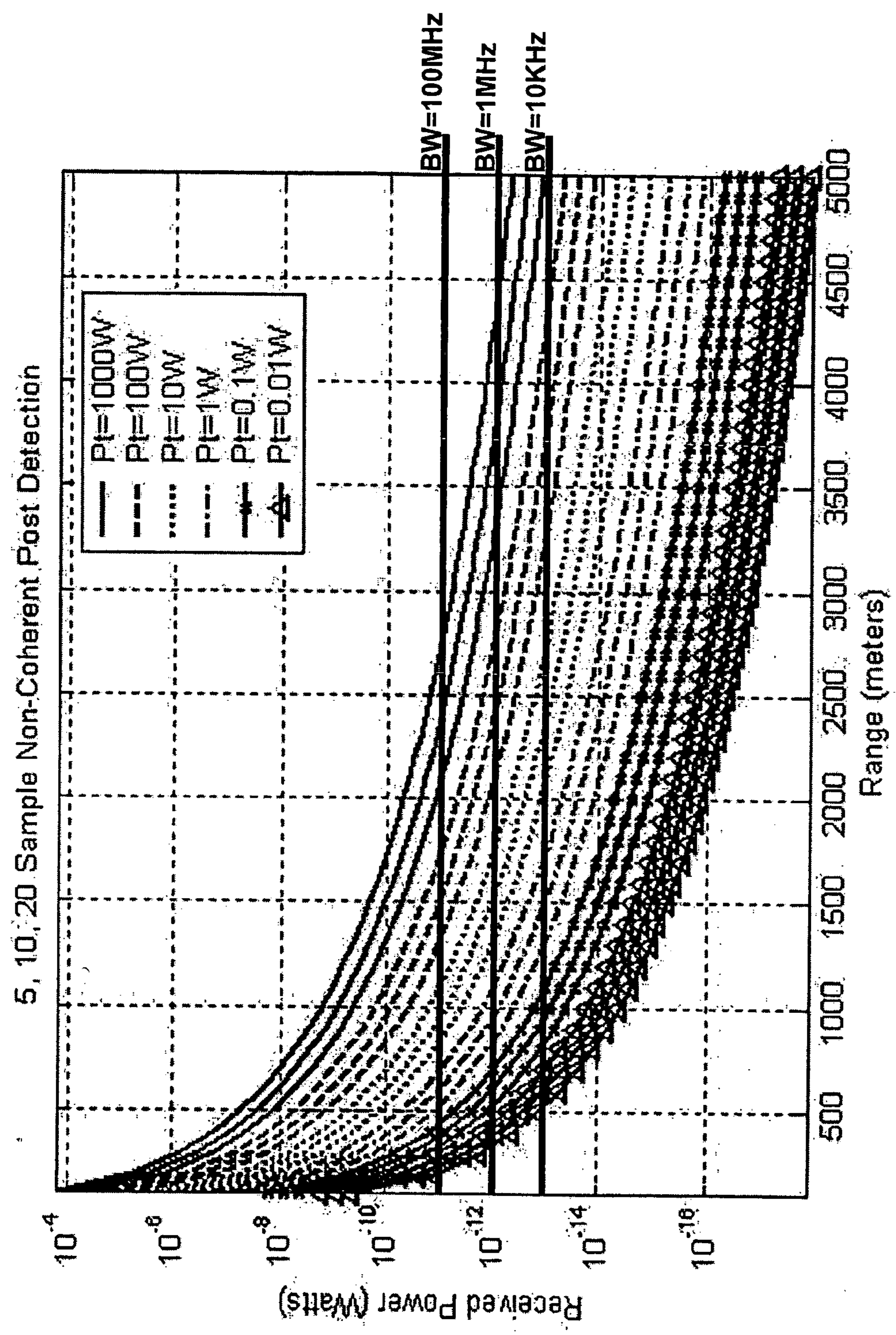
FIG. 12 is a plot showing range as a function of transmit power and signal integration.

Because FIG. 11 shows the ranges to be shorter than desired, additional post-detection processing can provide integration gain. FIG. 12 shows the effect of integration gain when five, ten, and twenty laser pulses are integrated. In each family of transmit power $P_t$ curves, the top curve corresponds to twenty samples, while the bottom curve corresponds to five samples. The gain due to integration of multiple samples is seen to provide significant increases in range. For example, when the transmit power $P_t$ is 100 W and twenty samples are integrated, the range is from 3.7 km to 1.5 km depending upon the photodetector bandwidth, while five integrated samples leads to a range from 3.0 km to 1.2 km depending on the photodetector bandwidth.

One potential advantage under favorable circumstances when operating with an optical system instead of a RF radar system is increased range. The optical system exhibits a two-way loss proportional to $1/R^2$, while RF systems exhibit a two-way loss proportional to $1/R^4$. The reason for this reduced signal loss is the cross section term in the radar equation. In RF systems, a target is treated as a point source because RF radar beamwidths are much larger than targets at typical operational ranges. In contrast, an optical system beamwidth, due to the small divergence of the laser beam, will not always be much larger than the target, and can actually be smaller than the target, especially at close approaches. If the target intercepts the entire laser beam, i.e., the laser beam is less than or equal to the area of the target, it is classified as an extended target with the result that its cross section has a $R^2$ dependence.

For standard scattering diffuse targets having Lambertian scattering, the cross section is defined by:

$$\sigma=4\rho_T dA, \qquad \text{Eq. 16}$$

where $\sigma$=cross section, $\rho_T$ is the target reflectivity, and dA is the area of the target. The area illuminated $A_1$ by a circular aperture at the target range R for a laser beam having a divergence of $\theta_T$ is:

$$A_1=\pi R^2\theta_T^2/4. \qquad \text{Eq. 17}$$

By fully illuminating the target, i.e., setting the target area equal to the illuminated area, one can substitute Eq. 17 into Eq. 16, yielding for an extended Lambertian target:

$$\sigma=\pi\rho_T R^2\theta_T^2. \qquad \text{Eq. 18}$$

Substituting Eq. 14 into Eq. 18 and the result into Eq. 15, provides:

$$P_r=\pi P_t\rho_T D^2\,\eta_{atm}\,\eta_{sys}/16R^2. \qquad \text{Eq. 19}$$

Figure 13:
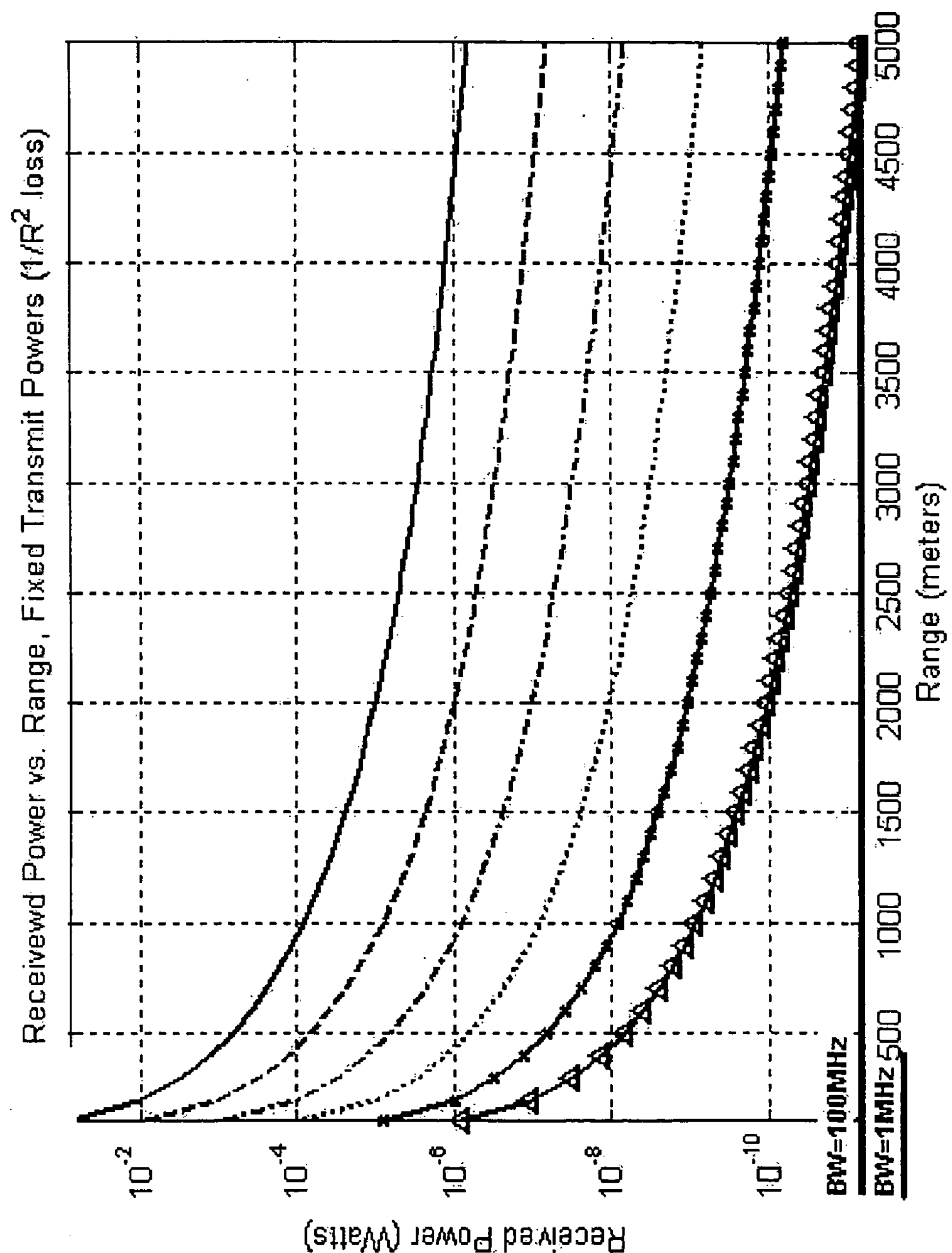
FIG. 13 is a plot showing range as a function of transmit power for an extended target.

Equation 19 is thus proportional to $1/R^2$, rather than $1/R^4$ as observed in RF systems. This effect is plotted in FIG. 13 for the same range of transmit powers $P_t$ as in FIG. 11. To take advantage of the increased range of Eq. 19, the laser beam divergence must be small enough such that the beam completely falls within the target area. It should be noted that even for poor beamwidths, Eq. 19 will apply for large targets such as ships and large aircraft.

Also related to range considerations is the noise in the photodetector. Standard photodetector noise factors for coherent detection include shot noise, thermal, background, dark current, and LO noise. The resulting signal to noise ratio (SNR) for coherent detection is:

$$SNR=\eta P_{LO}P_{SIG}/[h\nu B(P_{LO}+P_{SIG}+P_{BK})+K_3P_{DK}+K_4P_{TH}]. \qquad \text{Eq. 20}$$

The variables in Eq. 20 are as follows: $P_{LO}$ is the LO beam power on the photomixer, $P_{SIG}$ is the Doppler shifted beam power, $P_{BK}$ is the background noise power, $P_{DK}$ is the dark current noise power, $P_{TH}$ is the thermal noise power, while $K_3$ and $K_4$ are constants related to the photomixer's characteristics at the frequency of operation. In general, the LO beam power $P_{LO}$ can be increased to the point that it dominates all other noise sources. As a result, the LO beam power $P_{LO}$ in both the denominator and numerator cancel each other. This results in a SNR that is directly proportional to the signal power $P_{SIG}$:

$$SNR=\eta_D P_{SIG}/h\nu B. \qquad \text{Eq. 21}$$

Additionally, because the LO beam power $P_{LO}$ is the dominant noise source, the coherent photodetector is immune to background noise as only signals in phase with the LO are effectively detected.

Although the present invention has been fully described by way of examples with reference to the accompanying drawings, it is to be noted that various changes and modifications will be apparent to those skilled in the art. Therefore, such changes and modifications should be construed as being within the scope of the invention.

What is claimed is:

1. An apparatus for determining a direction to a target, the apparatus comprising:

a laser source for emitting a laser beam;

a beamsplitter for splitting the laser beam into first and second portions, the first portion being a transmit beam, the second portion being a local oscillator beam;

a transmitting window system for transmitting the transmit beam toward the target;

a receiving window system for receiving a Doppler shifted beam, the Doppler shifted beam being a portion of the transmit beam reflected by the target, a wavelength of the Doppler shifted beam being Doppler shifted due to a radial speed of the target, the receiving window system having an optical axis, the receiving window system having Fresnel transmittance properties, the receiving window system being configured such that if the Doppler shifted beam is parallel to the optical axis, the Doppler shifted beam is incident upon a surface of the receiving window system at a boresight incidence angle such that an instantaneous rate of change of the Fresnel transmittance as a function of angle of incidence at the boresight incidence angle is significantly different from zero;

at least four beam combiners for combining the Doppler shifted and local oscillator beams;

at least four photomixers, each photomixer being adapted to receive a portion of the thus combined Doppler shifted and local oscillator beams, each photomixer for photomixing the combined Doppler shifted and local oscillator beams, each photomixer for generating a respective photomixed signal;

at least four phase shifting elements, each phase shifting element for phase shifting a corresponding one of the photomixed signals, the at least four phase shifting elements for outputting corresponding shifted photomixed signals;

at least eight A/D converters, each A/D converter for converting a corresponding one of the photomixed or shifted photomixed signals, the at least eight A/D converters for outputting digital data;

a Doppler bin array for receiving the digital data, the Doppler bin array for storing the digital data by Doppler frequency; and an angle processor for processing the digital data from the Doppler bin array to determine azimuth, elevation, and summation signals for the target at each Doppler frequency, the angle processor thereby discriminating the target from a background at a corresponding azimuth and elevation based upon Doppler frequency.

2. An apparatus in accordance with claim 1, further comprising a radial speed processor for determining a radial speed of the target based upon a magnitude of the Doppler frequency.

3. An apparatus in accordance with claim 2, wherein the radial speed processor determines if the radial speed is positive, a distance between the apparatus and the target is increasing, or if the radial speed is negative, the distance between the apparatus and the target is decreasing.

4. An apparatus in accordance with claim 1, further comprising a range processor for determining a distance from the apparatus to the target.

5. An apparatus in accordance with claim 1, further comprising a field of view limiter for limiting a field of view of the at least four photomixers.

6. An apparatus in accordance with claim 1, further comprising at least four bandpass filters, each bandpass filter for filtering a corresponding one of the combined Doppler shifted and local oscillator beams.

7. An apparatus in accordance with claim 1, further comprising at least four lowpass filters, each lowpass filter for filtering a corresponding one of the photomixed signals.

8. An apparatus in accordance with claim 1, further comprising at least four amplifiers, each amplifier for amplifying a corresponding one of the photomixed signals.

9. An apparatus in accordance with claim 1, wherein a spectral width of the laser source is not greater than 10 kHz.

10. An apparatus in accordance with claim 1, wherein the laser source includes an external cavity diode laser.

11. An apparatus in accordance with claim 1, wherein the laser source further includes a doped fiber amplifier.

12. An apparatus in accordance with claim 1, wherein the laser source is a pulsed laser source.

13. An apparatus in accordance with claim 1, further comprising an acousto-optic modulator, the acousto-optic modulator for modulating a frequency of the laser beam.

14. An apparatus in accordance with claim 1, further comprising an acousto-optic modulator, the acousto-optic modulator for modulating a frequency of the local oscillator beam.

15. An apparatus in accordance with claim 1, wherein the Fresnel transmittance at the boresight incidence angle is 90 percent or less.

16. An apparatus in accordance with claim 1, wherein the Fresnel transmittance at the boresight incidence angle is 80 percent or less.

17. An apparatus in accordance with claim 1, wherein the Fresnel transmittance at the boresight incidence angle is 70 percent or less.

18. An apparatus in accordance with claim 1, wherein the boresight incidence angle is at least 60 degrees.

19. An apparatus in accordance with claim 1, wherein the boresight incidence angle is at least 70 degrees.

20. An apparatus in accordance with claim 1, wherein each of the at least four beam combiners includes a beamsplitter.

21. An apparatus in accordance with claim 1, wherein each of the at least four beam combiners includes a mirror with an aperture.

22. An apparatus in accordance with claim 1, wherein each of the at least four photomixers includes a photodetector.

23. An apparatus in accordance with claim 22, wherein each photodetector is a photodiode.

24. An apparatus in accordance with claim 1, wherein the angle processor integrates corresponding pluralities of azimuth, elevation, and summation signals, thereby increasing a tracking range.

25. An apparatus for determining a direction to a target, the apparatus comprising:

a laser source for emitting a laser beam;

a beamsplitter for splitting the laser beam into first and second portions, the first portion being a transmit beam, the second portion being a first local oscillator beam;

a transmitting window system for transmitting the transmit beam toward the target;

a receiving window system for receiving a Doppler shifted beam, the Doppler shifted beam being a portion of the transmit beam reflected by the target, a wavelength of the Doppler shifted beam being Doppler shifted due to a radial speed of the target, the receiving window system having an optical axis, the receiving window system having Fresnel transmittance properties, the receiving window system being configured such that if the Doppler shifted beam is parallel to the optical axis, the Doppler shifted beam is incident upon a surface of the receiving window system at a boresight incidence angle such that an instantaneous rate of change of the Fresnel transmittance as a function of angle of incidence at the boresight incidence angle is significantly different from zero;

at least four beam combiners for combining the Doppler shifted and first local oscillator beams;

at least four photomixers, each photomixer being adapted to receive a portion of the thus combined Doppler shifted and first local oscillator beams, each photomixer for photomixing the combined Doppler shifted and first local oscillator beams, each photomixer for generating a respective photomixed signal;

an oscillator for generating a second local oscillator signal;

a phase shifting element for phase shifting the second local oscillator signal, the phase shifting element for outputting a thus shifted second local oscillator signal;

at least four first mixers, each of the at least four first mixers for mixing the second local oscillator signal with a corresponding one of the photomixed signals, the at least four first mixers for outputting corresponding mixed photomixed signals;

at least four second mixers, each of the at least four second mixers for mixing the shifted second local oscillator signal with a corresponding one of the photomixed signals, the at least four second mixers for outputting corresponding shifted mixed photomixed signals;

at least eight A/D converters, each A/D converter for converting a corresponding one of the mixed photomixed or shifted mixed photomixed signals, the at least eight A/D converters for outputting digital data;

a Doppler bin array for receiving the digital data, the Doppler bin array for storing the digital data by Doppler frequency; and an angle processor for processing the digital data from the Doppler bin array to determine azimuth, elevation, and summation signals for the target at each Doppler frequency, the angle processor thereby discriminating the target from a background at a corresponding azimuth and elevation based upon Doppler frequency.

26. An apparatus in accordance with claim 25, further comprising a radial speed processor for determining a radial speed of the target based upon a magnitude of the Doppler frequency.

27. An apparatus in accordance with claim 26, wherein the radial speed processor determines if the radial speed is positive, a distance between the apparatus and the target is increasing, or if the radial speed is negative, the distance between the apparatus and the target is decreasing.

28. An apparatus in accordance with claim 25, further comprising a range processor for determining a distance from the apparatus to the target.

29. An apparatus in accordance with claim 25, further comprising a field of view limiter for limiting a field of view of the at least four photomixers.

30. An apparatus in accordance with claim 25, further comprising at least four bandpass filters, each bandpass filter for filtering a corresponding one of the combined Doppler shifted and first local oscillator beams.

31. An apparatus in accordance with claim 25, further comprising at least four lowpass filters, each lowpass filter for filtering a corresponding one of the photomixed signals.

32. An apparatus in accordance with claim 25, further comprising at least four amplifiers, each amplifier for amplifying a corresponding one of the photomixed signals.

33. An apparatus in accordance with claim 25, further comprising at least eight lowpass filters, each lowpass filter for filtering a corresponding one of the mixed photomixed and shifted mixed photomixed signals.

34. An apparatus in accordance with claim 25, wherein a spectral width of the laser source is not greater than 10 kHz.

35. An apparatus in accordance with claim 25, wherein the laser source includes an external cavity diode laser.

36. An apparatus in accordance with claim 25, wherein the laser source further includes a doped fiber amplifier.

37. An apparatus in accordance with claim 25, wherein the laser source is a pulsed laser source.

38. An apparatus in accordance with claim 25, further comprising an acousto-optic modulator, the acousto-optic modulator for modulating a frequency of the laser beam.

39. An apparatus in accordance with claim 25, further comprising an acousto-optic modulator, the acousto-optic modulator for modulating a frequency of the first local oscillator beam.

40. An apparatus in accordance with claim 25, wherein the Fresnel transmittance at the boresight incidence angle is 90 percent or less.

41. An apparatus in accordance with claim 25, wherein the Fresnel transmittance at the boresight incidence angle is 80 percent or less.

42. An apparatus in accordance with claim 25, wherein the Fresnel transmittance at the boresight incidence angle is 70 percent or less.

43. An apparatus in accordance with claim 25, wherein the boresight incidence angle is at least 60 degrees.

44. An apparatus in accordance with claim 25, wherein the boresight incidence angle is at least 70 degrees.

45. An apparatus in accordance with claim 25, wherein each of the at least four beam combiners includes a beamsplitter.

46. An apparatus in accordance with claim 25, wherein each of the at least four beam combiners includes a mirror with an aperture.

47. An apparatus in accordance with claim 25, wherein each of the at least four photomixers includes a photodetector.

48. An apparatus in accordance with claim 47, wherein each photodetector is a photodiode.

49. An apparatus in accordance with claim 25, wherein the oscillator is a variable frequency oscillator.

50. An apparatus in accordance with claim 25, wherein the angle processor integrates corresponding pluralities of azimuth, elevation, and summation signals, thereby increasing a tracking range.

51. A guidable munition for striking a target, the guided munition comprising:

a body;

control means for controlling a direction of the guidable munition, the control means being responsive to guidance signals, the control means being attached to the body;

a radome attached to a forward portion of the body; and a guidance apparatus, the guidance apparatus including:

a laser source for emitting a laser beam;

a beamsplitter for splitting the laser beam into first and second portions, the first portion being a transmit beam, the second portion being a local oscillator beam;

a transmitting window system for transmitting the transmit beam toward the target;

a receiving window system for receiving a Doppler shifted beam, the Doppler shifted beam being a portion of the transmit beam reflected by the target, a wavelength of the Doppler shifted beam being Doppler shifted due to a radial speed of the target, the receiving window system having an optical axis, the receiving window system having Fresnel transmittance properties, the receiving window system being configured such that if the Doppler shifted beam is parallel to the optical axis, the Doppler shifted beam is incident upon a surface of the receiving window system at a boresight incidence angle such that an instantaneous rate of change of the Fresnel transmittance as a function of angle of incidence at the boresight incidence angle is significantly different from zero;

at least four beam combiners for combining the Doppler shifted and local oscillator beams;

at least four photomixers, each photomixer being adapted to receive a portion of the thus combined Doppler shifted and local oscillator beams, each photomixer for photomixing the combined Doppler shifted and local oscillator beams, each photomixer for generating a respective photomixed signal;

at least four phase shifting elements, each phase shifting element for phase shifting a corresponding one of the photomixed signals, the at least four phase shifting elements for outputting corresponding shifted photomixed signals;

at least eight A/D converters, each A/D converter for converting a corresponding one of the photomixed or shifted photomixed signals, the at least eight A/D converters for outputting digital data;

a Doppler bin array for receiving the digital data, the Doppler bin array for storing the digital data by Doppler frequency;

an angle processor for processing the digital data from the Doppler bin array to determine azimuth, elevation, and summation signals for the target at each Doppler frequency, the angle processor thereby discriminating the target from a background at a corresponding azimuth and elevation based upon Doppler frequency, the angle processor being adapted to generate guidance signals based upon the azimuth and elevation signals.

52. A guidable munition in accordance with claim 51, further comprising a radial speed processor for determining a radial speed of the target based upon a magnitude of the Doppler frequency, the radial speed processor being adapted to generate guidance signals based upon the radial speed.

53. A guidable munition in accordance with claim 51, further comprising a range processor for determining a distance from the guidable munition to the target, the range processor being adapted to generate guidance signals based upon the distance.

54. A guidable munition in accordance with claim 51, further comprising an acousto-optic modulator, the acousto-optic modulator for modulating a frequency of the laser beam.

55. A guidable munition in accordance with claim 51, further comprising an acousto-optic modulator, the acousto-optic modulator for modulating a frequency of the local oscillator beam.

56. A guidable munition for striking a target, the guided munition comprising:

a body;

control means for controlling a direction of the guidable munition, the control means being responsive to guidance signals, the control means being attached to the body;

a radome attached to a forward portion of the body; and a guidance apparatus, the guidance apparatus including:

a laser source for emitting a laser beam;

a beamsplitter for splitting the laser beam into first and second portions, the first portion being a transmit beam, the second portion being a first local oscillator beam;

a transmitting window system for transmitting the transmit beam toward the target;

a receiving window system for receiving a Doppler shifted beam, the Doppler shifted beam being a portion of the transmit beam reflected by the target, a wavelength of the Doppler shifted beam being Doppler shifted due to a radial speed of the target, the receiving window system having an optical axis, the receiving window system having Fresnel transmittance properties, the receiving window system being configured such that if the Doppler shifted beam is parallel to the optical axis, the Doppler shifted beam is incident upon a surface of the receiving window system at a boresight incidence angle such that an instantaneous rate of change of the Fresnel transmittance as a function of angle of incidence at the boresight incidence angle is significantly different from zero;

at least four beam combiners for combining the Doppler shifted and first local oscillator beams;

at least four photomixers, each photomixer being adapted to receive a portion of the thus combined Doppler shifted and first local oscillator beams, each photomixer for photomixing the combined Doppler shifted and first local oscillator beams, each photomixer for generating a respective photomixed signal;

an oscillator for generating a second local oscillator signal;

a phase shifting element for phase shifting the second local oscillator signal, the phase shifting element for outputting a thus shifted second local oscillator signal;

at least four first mixers, each of the at least four first mixers for mixing the second local oscillator signal with a corresponding one of the photomixed signals, the at least four first mixers for outputting corresponding mixed photomixed signals;

at least four second mixers, each of the at least four second mixers for mixing the shifted second local oscillator signal with a corresponding one of the photomixed signals, the at least four second mixers for outputting corresponding shifted mixed photomixed signals;

at least eight A/D converters, each A/D converter for converting a corresponding one of the mixed photomixed or shifted mixed photomixed signals, the at least eight A/D converters for outputting digital data;

a Doppler bin array for receiving the digital data, the Doppler bin array for storing the digital data by Doppler frequency; and an angle processor for processing the digital data from the Doppler bin array to determine azimuth, elevation, and summation signals for the target at each Doppler frequency, the angle processor thereby discriminating the target from a background at a corresponding azimuth and elevation based upon Doppler frequency, the angle processor being adapted to generate guidance signals based upon the azimuth and elevation signals.

57. A guidable munition in accordance with claim 56, further comprising a range processor for determining a distance from the guidable munition to the target, the range processor being adapted to generate guidance signals based upon the distance.

58. A guidable munition in accordance with claim 56, further comprising an acousto-optic modulator, the acousto-optic modulator for modulating a frequency of the laser beam.

59. A guidable munition in accordance with claim 56, further comprising an acousto-optic modulator, the acousto-optic modulator for modulating a frequency of the first local oscillator beam.

* * * * *